US011192593B2

(12) United States Patent
Tanaka et al.

(10) Patent No.: US 11,192,593 B2
(45) Date of Patent: Dec. 7, 2021

(54) VEHICLE BODY STRUCTURE OF VEHICLE

(71) Applicant: MAZDA MOTOR CORPORATION, Hiroshima (JP)

(72) Inventors: Junichi Tanaka, Hiroshima (JP); Takehiro Kamei, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 14 days.

(21) Appl. No.: 16/954,982

(22) PCT Filed: Mar. 1, 2019

(86) PCT No.: PCT/JP2019/008130
§ 371 (c)(1),
(2) Date: Jun. 17, 2020

(87) PCT Pub. No.: WO2019/172127
PCT Pub. Date: Sep. 12, 2019

(65) Prior Publication Data
US 2020/0307695 A1 Oct. 1, 2020

(30) Foreign Application Priority Data
Mar. 6, 2018 (JP) .............................. JP2018-039487

(51) Int. Cl.
*B62D 25/08* (2006.01)
*B62D 25/04* (2006.01)
(Continued)

(52) U.S. Cl.
CPC ........... *B62D 25/081* (2013.01); *B62D 25/04* (2013.01); *B62D 25/06* (2013.01); *B62D 25/08* (2013.01);
(Continued)

(58) Field of Classification Search
CPC .... B62D 25/081; B62D 25/088; B62D 25/04; B62D 25/08; B62D 25/2018; B62D 25/02; B62D 25/20
(Continued)

(56) References Cited

U.S. PATENT DOCUMENTS

2015/0028629 A1    1/2015  Sasaki et al.

FOREIGN PATENT DOCUMENTS

JP      2007118636 A    5/2007
JP      2009035106 A    2/2009
(Continued)

OTHER PUBLICATIONS

International Search Report issued in PCT/JP2019/008130; dated Apr. 9, 2019.

*Primary Examiner* — Dennis H Pedder
(74) *Attorney, Agent, or Firm* — Studebaker & Brackett PC

(57) ABSTRACT

A vehicle body structure includes: a front lateral ring-shaped vehicle body framework (FWC) having a substantially ring shape in a vehicle lateral direction, disposed near suspension towers (65), and constituted by front subframes (66), suspension tower reinforcing members (65b), and a cowl box (62); and longitudinal ring-shaped vehicle body frameworks (SLC) disposed along side door openings (Es). The vehicle body structure includes: cowl side frames (64) coupling upper ends of hinge pillars (45) constituting the longitudinal ring-shaped vehicle body frameworks (SLC) to the suspension towers (65) in a vehicle longitudinal direction; and side part panels (71) connected to the cowl box (62) and coupled to the suspension towers (65).

12 Claims, 13 Drawing Sheets

(51) Int. Cl.
*B62D 25/06* (2006.01)
*B62D 25/20* (2006.01)
*B62D 21/02* (2006.01)

(52) U.S. Cl.
CPC .......... *B62D 25/088* (2013.01); *B62D 25/20* (2013.01); *B62D 21/02* (2013.01)

(58) Field of Classification Search
USPC ......... 296/203.01, 2, 193.05, 193.09, 29, 30
See application file for complete search history.

(56) References Cited

FOREIGN PATENT DOCUMENTS

| | | | |
|---|---|---|---|
| JP | 2009137380 | A | 6/2009 |
| JP | 2017009606 | A | 1/2017 |
| WO | 2013125334 | A1 | 8/2013 |

FIG.13
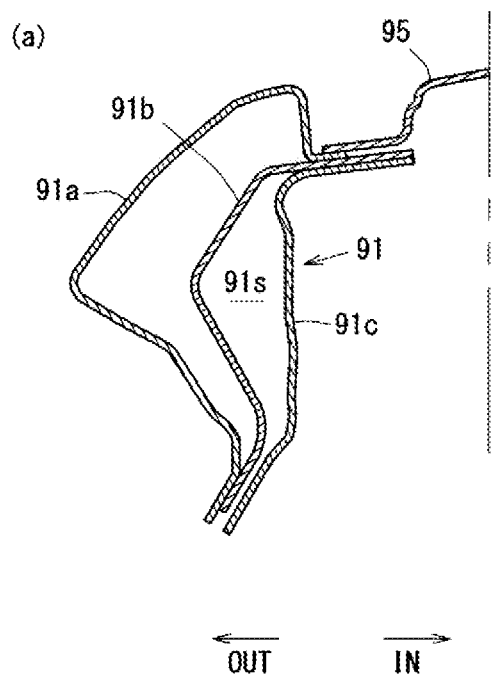
(a)
← OUT | IN →
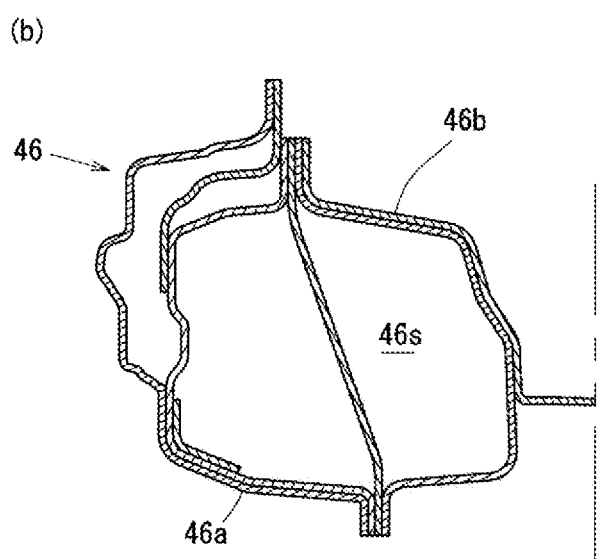
(b)

VEHICLE BODY STRUCTURE OF VEHICLE

TECHNICAL FIELD

The technique disclosed here relates to a vehicle body structure in which a vehicle body framework having a substantially ring shape in a vehicle width direction (lateral direction) is formed near a front suspension tower.

BACKGROUND ART

Patent Document 1, for example, describes a vehicle body structure in which a vehicle body framework in the vehicle lateral direction having a substantially ring shape in a vehicle front view is formed near front suspension towers and constituted by reinforcing members that form closed cross sections between a damper housing and a cowl member coupling upper portions of left and right front suspension towers in the vehicle lateral direction and that couple front suspension tower tops to lower front side frames in the vehicle lateral direction, and suspension frames coupling frames below the front suspension towers in the vehicle lateral direction.

Substantially ring-shaped vehicle body frameworks are also formed at the peripheries of side door openings, and are coupled to the vehicle body framework having a substantially ring shape in the vehicle lateral direction. Accordingly, support stiffness of suspensions can be enhanced in the entire vehicle. However, the front suspension towers are separated away from the substantially ring-shaped vehicle body frameworks formed at the peripheries of the side door openings. Thus, it has been difficult to enhance support stiffness of the suspensions in the entire vehicle body.

CITATION LIST

Patent Document

PATENT DOCUMENT 1: Japanese Patent Application Publication No. 2017-009606

SUMMARY OF THE INVENTION

Technical Problem

The technique disclosed here has been made in view of the foregoing circumstances, and has an object of providing a vehicle body structure that can enhance support stiffness of suspensions in the entire vehicle body.

Solution to the Problem

The technique disclosed here is directed to a vehicle body structure, and includes: a first vehicle body framework having a substantially ring shape in a vehicle lateral direction, and disposed at vehicle front of side door openings of the vehicle; and second vehicle body frameworks each having a ring shape in a vehicle longitudinal direction at peripheries of the side door openings of the vehicle, wherein the first vehicle body framework includes a pair of left and right front suspension towers including damper support portions supporting front suspension dampers, front subframes coupling lower portions of the pair of left and right front suspension towers in the vehicle lateral direction, suspension tower reinforcing members extending in a vehicle vertical direction along the pair of left and right front suspension towers, and a cowl member that is a closed cross section member formed by a cowl panel and a cowl cross member, the cowl panel and the cowl cross member being disposed in the vehicle lateral direction behind the pair of left and right front suspension towers, the second vehicle body framework includes a pair of left and right hinge pillars disposed in a vehicle body front portion, a pair of left and right front pillars extending rearward and upward from upper ends of the pair of left and right hinge pillars, a pair of left and right roof side rails extending in the vehicle longitudinal direction, a pair of left and right side pillars disposed along rear ends of the side door openings, and a pair of left and right side sills coupling lower ends of the pair of left and right side pillars to lower ends of the pair of left and right hinge pillars in the vehicle longitudinal direction, the vehicle body structure further includes cowl side frames coupling, in the vehicle longitudinal direction, upper ends of the pair of left and right hinge pillars constituting the second vehicle body framework to outer sides of the pair of left and right front suspension towers in the vehicle lateral direction, and side part panels connected to ends of the cowl member in the vehicle lateral direction, and coupled to the pair of left and right front suspension towers, and the side part panels are made of plate members thicker than the cowl panel, and include front wall surfaces extending in the vehicle vertical direction along front suspension tower rear walls serving as rear side surfaces of the pair of left and right front suspension towers, front upper surfaces continuous to upper portions of the front wall surfaces and extending in the vehicle longitudinal direction along front suspension tower upper surfaces serving as upper surfaces of the pair of left and right front suspension towers, side wall surfaces continuous to the front wall surfaces and extending in the vehicle vertical direction along cowl side inner surfaces serving as inner side surfaces of the cowl side frames in the vehicle lateral direction, and side upper surfaces continuous to upper portions of the side wall surfaces and the front upper surfaces, and extending in the vehicle lateral direction along cowl side upper surfaces serving as upper surfaces of the cowl side frames.

With this configuration, support stiffness of suspensions can be enhanced in the entire vehicle body in the vehicle body structure.

Specifically, the first vehicle body framework having the substantially ring shape in the vehicle lateral direction is disposed near the front suspension towers, and constituted by the front subframe coupling lower portions of the left and right front suspension towers in the vehicle lateral direction, the suspension tower reinforcing members extending in the vehicle vertical direction along the front suspension towers, and the closed cross section member formed by the cowl panel and the cowl cross member disposed in the vehicle lateral direction behind the left and right front suspension towers.

The second ring-shaped vehicle body frameworks each having the substantially ring shape in the vehicle longitudinal direction are constituted by the pair of left and right hinge pillars 45 disposed in the vehicle body front portion, the pair of left and right front pillars extending rearward and upward from the upper ends of the hinge pillars, the pair of left and right roof side rails extending in the vehicle longitudinal direction, the pair of left and right side pillars extending along the rear ends of the side door openings, and the pair of left and right side sills coupling the lower ends of the side pillars to the lower ends of the hinge pillars in the vehicle longitudinal direction.

In addition, the second vehicle body frameworks can be coupled to the first vehicle body framework by the cowl side frames coupling the upper ends of the hinge pillars constituting the second vehicle body frameworks to the laterally outer sides of the front suspension towers constituting the first vehicle body framework in the vehicle longitudinal direction.

Moreover, the side part panels coupled to the cowl member and the front suspension towers are made of the plate member thicker than the cowl panel, and constituted by the front wall surfaces extending in the vehicle vertical direction along the front suspension tower rear walls, the front upper surfaces continuous to the upper portions of the front wall surfaces and extending in the vehicle longitudinal direction along the front suspension towers, the side wall surfaces continuous to the front wall surfaces and extending in the vehicle vertical direction along the cowl side inner surfaces, and the side upper surface s continuous to the upper portions of the side wall surfaces and the front upper surfaces and extending in the vehicle lateral direction along the cowl side upper surface. Accordingly, stiffness in coupling to the first vehicle body frameworks in the cowl side frames can be enhanced.

In the side part panels, the front wall surfaces and the side wall surfaces form bent shapes such as substantially L shapes in plan view, and the front upper surfaces continuous to the upper portions of the front wall surfaces are continuous to the side upper surfaces continuous to the upper portions of the side wall surface. Thus, bent shapes such as substantially L shapes in plan view are also formed in cross sections in the vehicle longitudinal direction and the vehicle lateral direction along the vehicle vertical direction. In addition, since the side part panels are made of plate materials thicker than the cowl panel. Thus, member shaving high stiffness with respect to any direction in three dimensions can be obtained.

In addition, the front wall surfaces of the side part panels constituting members having high stiffness with respect to any direction in three dimensions with the configuration described above extend along the front suspension tower rear walls, the front upper surfaces continuous to the upper portions of the front wall surfaces extend along the front suspension tower upper surfaces, the side wall surfaces continuous to the front wall surfaces extend along the cowl side inner surfaces, and the side upper surfaces continuous to the upper portions of the side wall surfaces and the front upper surfaces extend along the cowl side upper surfaces. Thus, joint portions of the front suspension tower rear walls can be reinforced, and as compared to the case of coupling with a merely plate-shaped coupling member, for example, stiffness in coupling to the first vehicle body framework in the cowl side frames can be enhanced.

In the manner described above, since the side part panels can enhance stiffness in coupling to the first vehicle body framework in the cowl side frames coupling the second vehicle body frameworks to the first vehicle body framework, support stiffness of the suspensions can be enhanced in the entire vehicle. Thus, forces input by the front suspensions and the rear suspensions can be transferred without delay so that comfort of passengers can be enhanced.

Furthermore, even in a case where the front suspension towers are separated away from the cowl member, since the side part panels made of plate members thicker than the cowl panel couple the front suspension towers to the cowl member, the first vehicle body framework having high stiffness can be obtained.

The substantially ring-shaped vehicle body framework may have any shape as long as the vehicle body framework has a substantially ring shape with which a mechanical load can be transferred, and may have a substantially ring shape constituted by a plurality of members. A member constituting the substantially ring-shaped vehicle body framework may be a member having a closed cross section, or may be a member having an open cross section as long as the member can be evaluated as a mechanically structural member. The open member preferably constitutes a closed cross section together with another member.

The vehicle body structure may further include side part panel reinforcing members whose inner sides in the vehicle lateral direction are joined to the side part panels and whose outer ends in the vehicle lateral direction are joined to the cowl side frames, and the side part panels, the side part panel reinforcing members, and the front suspension tower rear walls may constitute a closed cross section extending in the vehicle lateral direction.

With this configuration, support stiffness of suspensions can be further enhanced in the entire vehicle body in the vehicle body structure.

Specifically, stiffness in coupling to the first vehicle body framework in the cowl side frames can be further enhanced by the side part panels coupled to the cowl side frames coupling the second vehicle body frameworks to the first vehicle body framework and the cowl member and by the side part panel reinforcing members whose laterally inner sides are joined to the side part panels and laterally outer ends are joined to the cowl side frames.

In addition, since the closed cross sections extending in the vehicle lateral direction are formed by the side part panels, the side part panel reinforcing members, and the front suspension tower rear walls, stiffness of the suspension towers, that is, support stiffness of the front dampers, can be enhanced. Thus, inward collapse of the front suspension towers can be reduced, forces input by the front suspensions and the rear suspensions can be transferred without delay, and comfort of passengers can be enhanced.

In the vehicle body structure, the cowl side frames may have closed cross sections extending in the vehicle longitudinal direction and constituted by cowl side outer surfaces serving as outer side surfaces in the vehicle lateral direction, the cowl side upper surfaces, and cowl side lower surfaces, the cowl side upper surfaces coupling upper portions of the cowl side outer surfaces and the cowl side inner surfaces, cowl side lower surfaces coupling lower portions of the cowl side outer surfaces and the cowl side inner surfaces, the pair of left and right hinge pillars extending in the vehicle vertical direction may include hinge pillar outer side surfaces serving as outer side surfaces in the vehicle lateral direction, hinge pillar inner side surfaces serving as inner side surfaces in the vehicle lateral direction, and hinge pillar front side surfaces disposed at front ends of the hinge pillar outer side surfaces and serving as front side surfaces in vehicle longitudinal direction, rear ends of the cowl side outer surfaces, the cowl side inner surfaces, and the cowl side lower surfaces may be joined to the hinge pillar outer side surfaces, the hinge pillar inner side surfaces, and the hinge pillar front side surfaces, respectively, rear ends of the cowl side upper surfaces may be joined to upward surfaces of the pair of left and right hinge pillars, and the vehicle body structure may further include cowl side reinforcements whose front portions are joined to rear ends of the cowl side upper surfaces and whose rear portions are joined to the hinge pillar inner side surfaces.

With this configuration, coupling between the cowl side frames coupling the first vehicle body framework to the second vehicle body frameworks, and the hinge pillars constituting second vehicle body frameworks can be reinforced through the cowl side reinforcements. Thus, stiffness in coupling the first vehicle body framework to the second vehicle body frameworks can be further enhanced.

The upward surfaces of the hinge pillars may be the upper surfaces of the hinge pillars or front surfaces of the front pillar to which the upper ends of the hinge pillars are coupled.

In another aspect, the vehicle body structure may further include gusset members coupling ends of the cowl panels in the vehicle lateral direction to the hinge pillar inner side surfaces, and the cowl side reinforcements may be coupled to the gusset members.

With this configuration, coupling between the cowl side frames coupling the first vehicle body framework to the second vehicle body frameworks, and the cowl panel constituting the lateral vehicle body framework can be reinforced through the cowl side reinforcements and the gusset members. Thus, stiffness in coupling the first vehicle body framework to the second vehicle body frameworks can be further enhanced.

In the vehicle body structure, a third vehicle body framework having a substantially ring shape in the vehicle lateral direction may be disposed near damper support portions of left and right rear suspensions, and constituted by a rear header, the pair of left and right side pillars, a pair of left and right wheelhouse reinforcements disposed along rear wheelhouses, and floor cross-members.

With this configuration, the third vehicle body framework having the substantially ring shape in the vehicle lateral direction and disposed near the damper support portions of the left and right rear suspensions can be coupled to the second vehicle body frameworks by using the side pillars. Thus, support stiffness of the damper support portions of the rear suspensions in the vehicle body rear portion can be further enhanced so that support stiffness of the suspensions in the entire vehicle body can be enhanced.

Advantages of the Invention

According to the invention, support stiffness of the suspensions can be enhanced in the entire vehicle body.

BRIEF DESCRIPTION OF THE DRAWINGS

FIG. 13 An illustration showing a cross-sectional view of a structural member.

DESCRIPTION OF EMBODIMENTS

An exemplary embodiment will be described in detail based on the drawings.

Figure 2:
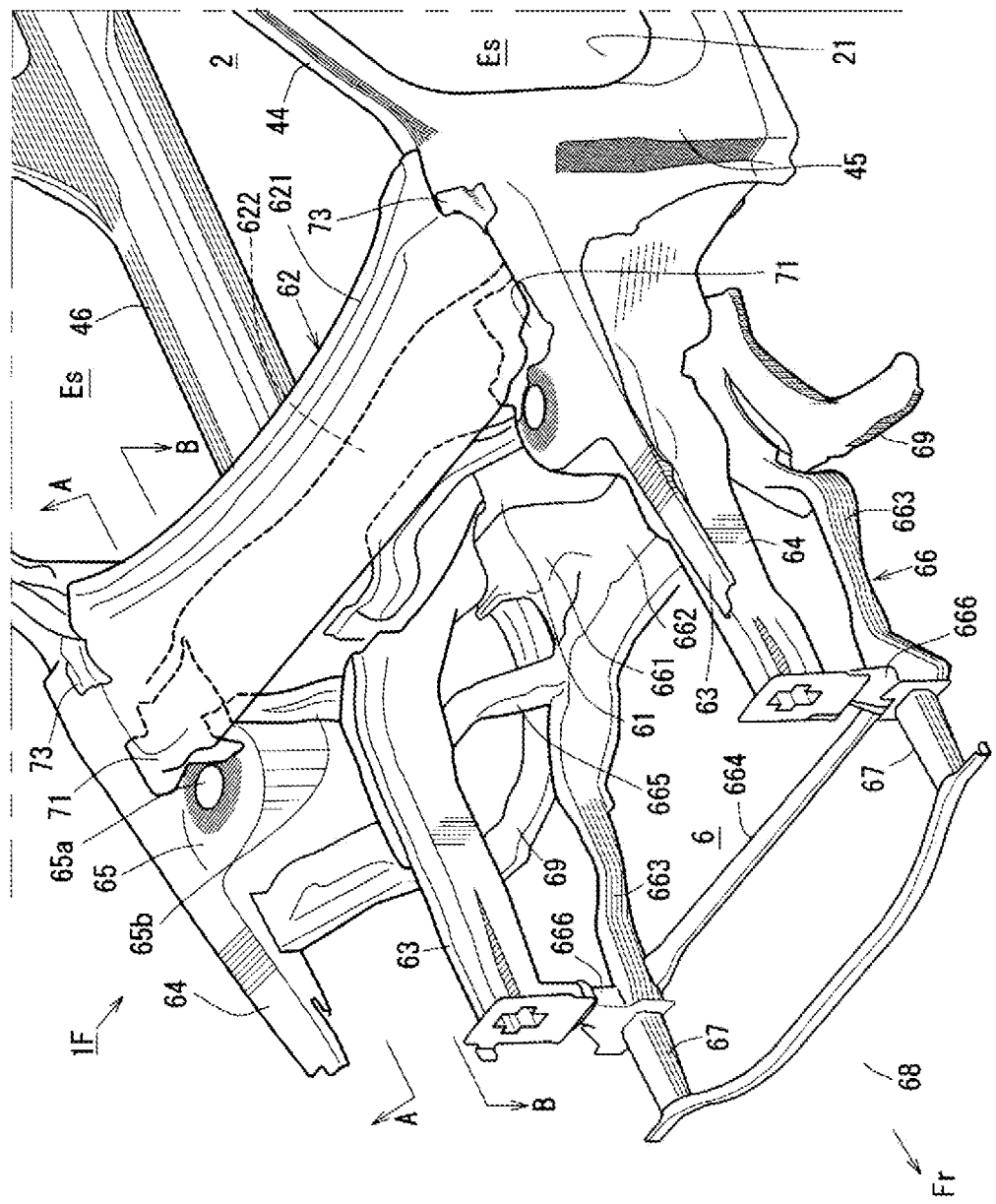
FIG. 2 A perspective view illustrating a vehicle body structure in a vehicle front portion according to the embodiment when seen from the front.
Figure 3:
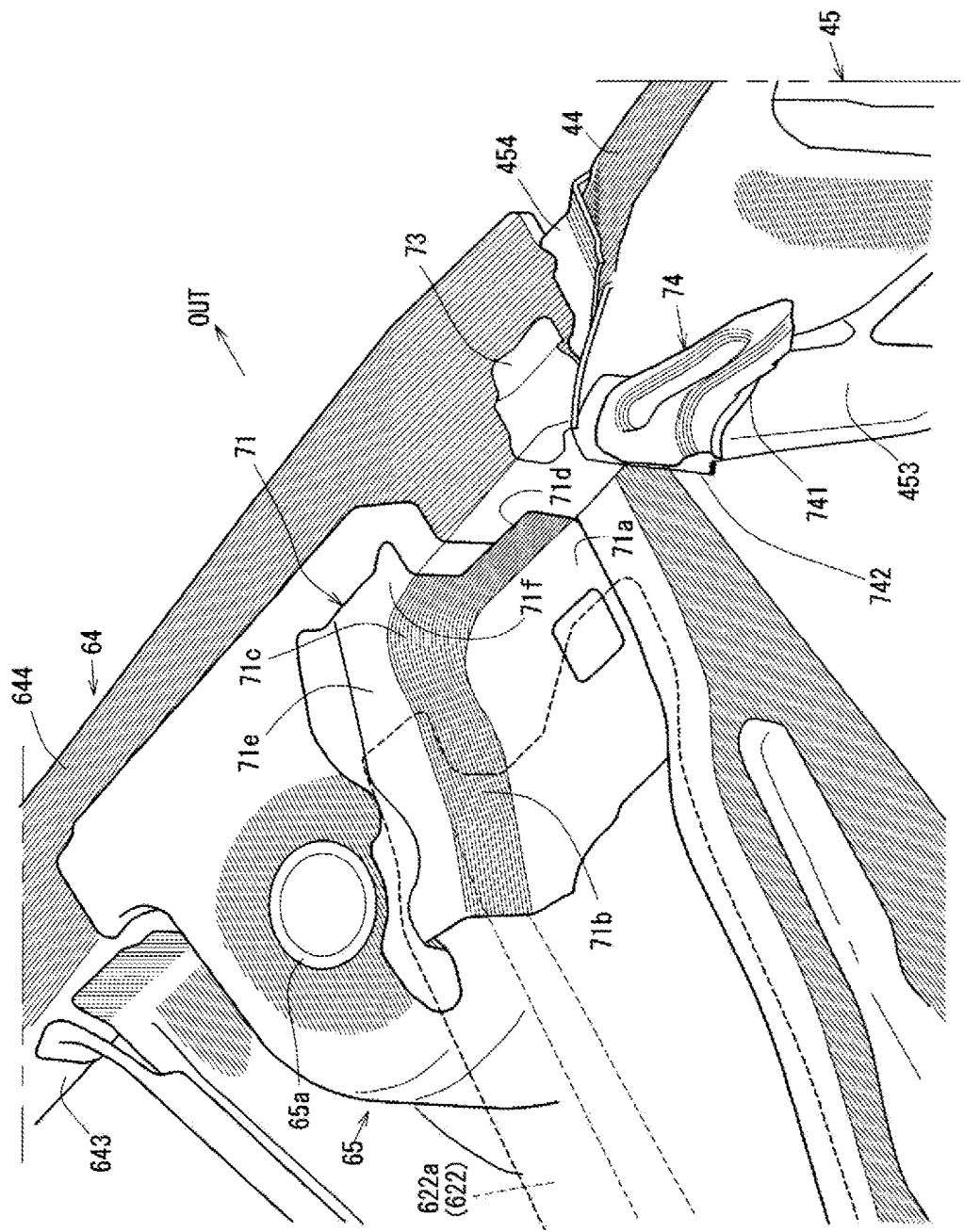
FIG. 3 An enlarged perspective view illustrating a main portion of the vehicle body structure in a vehicle front portion of the embodiment when seen from the inside.
Figure 4:
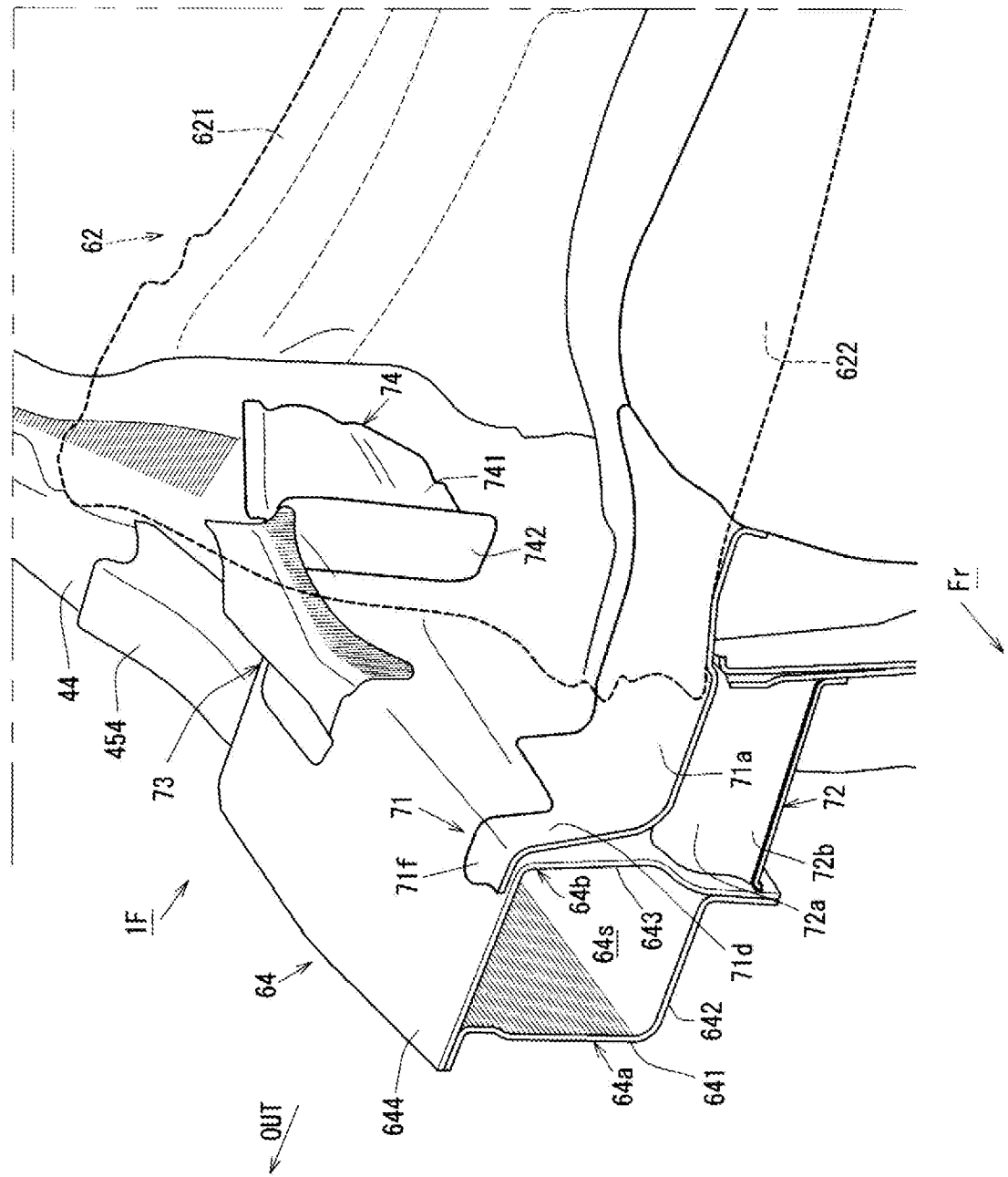
FIG. 4 An enlarged perspective view illustrating a main portion of the vehicle body structure in a vehicle front portion of the embodiment when seen from the inner front.

A vehicle body structure in a vehicle rear portion according to this embodiment is laterally symmetric, and thus, only a left side of the vehicle body is illustrated in FIGS. 3 through 11. FIG. 13(a) is a cross-sectional view of a roof side rail 91. FIG. 13(b) is a cross-sectional view of a side sill 46. FIG. 2 illustrates a cowl cross member 622 in a transmissive state, and FIGS. 3 and 4 illustrate a cowl box 62 in a transmissive state.

In the drawings, arrows Fr and Rr represent front-rear directions (longitudinal direction), arrow Fr represents a forward direction, and an arrow Rr represents a rearward direction. Arrows Rh and Lh represent width directions (lateral directions), and arrow Rh represents a rightward direction, and arrow Lh represents a leftward direction. Arrow IN represents an inward direction in a vehicle lateral direction, and arrow OUT represents an outward direction in the vehicle lateral direction.

The vehicle body structure in the vehicle of this embodiment is a structure of a so-called hatchback vehicle having a rear opening Er in a vehicle body rear portion 1R of a vehicle body 1 in which a trunk 3 is disposed at the rear of (behind) a cabin 2. The rear opening Er is configured to be covered with a lift gate (not shown) such that the rear opening Er is opened and closed. A portion of the vehicle body 1 behind center pillars 43 described later is defined as the vehicle body rear portion 1R, and a portion at the front of (ahead of) the center pillars 43 is defined as a vehicle body front portion 1F.

Figure 1:
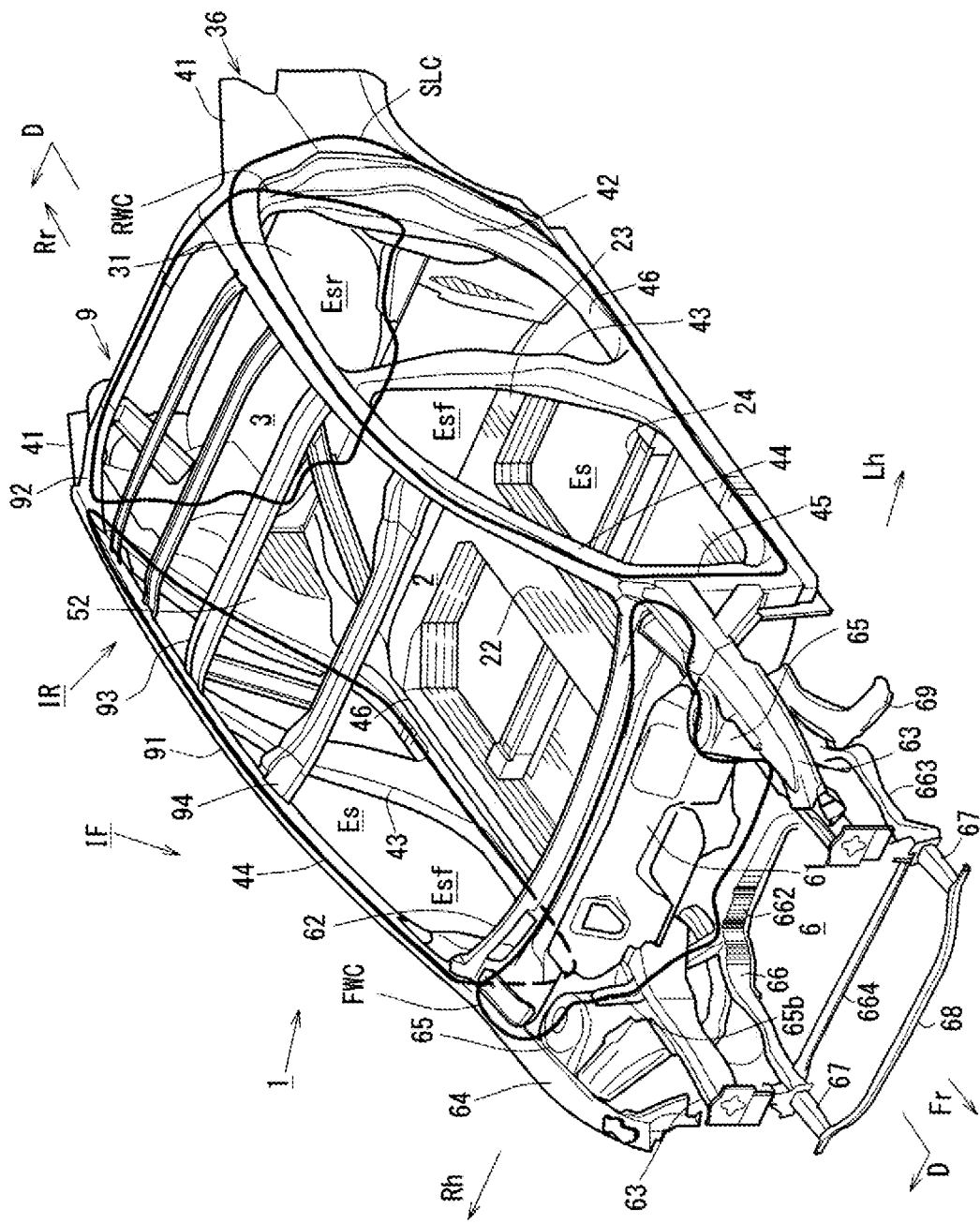
FIG. 1 A perspective view illustrating a vehicle body structure according to an embodiment when seen from the front.
Figure 8:
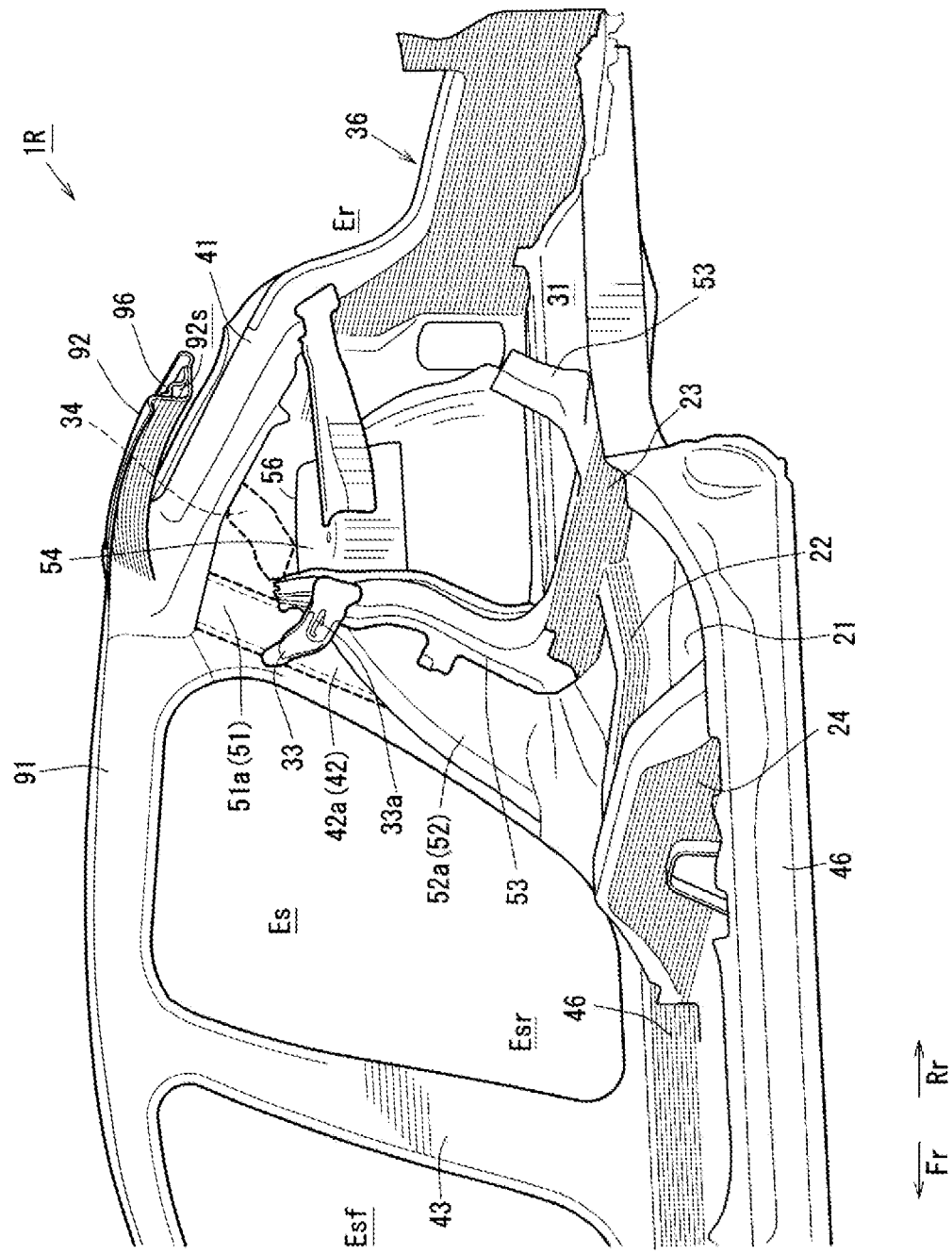
FIG. 8 A side view illustrating the main portion of the vehicle body structure in the vehicle rear portion of the embodiment when seen from the inside.
Figure 9:
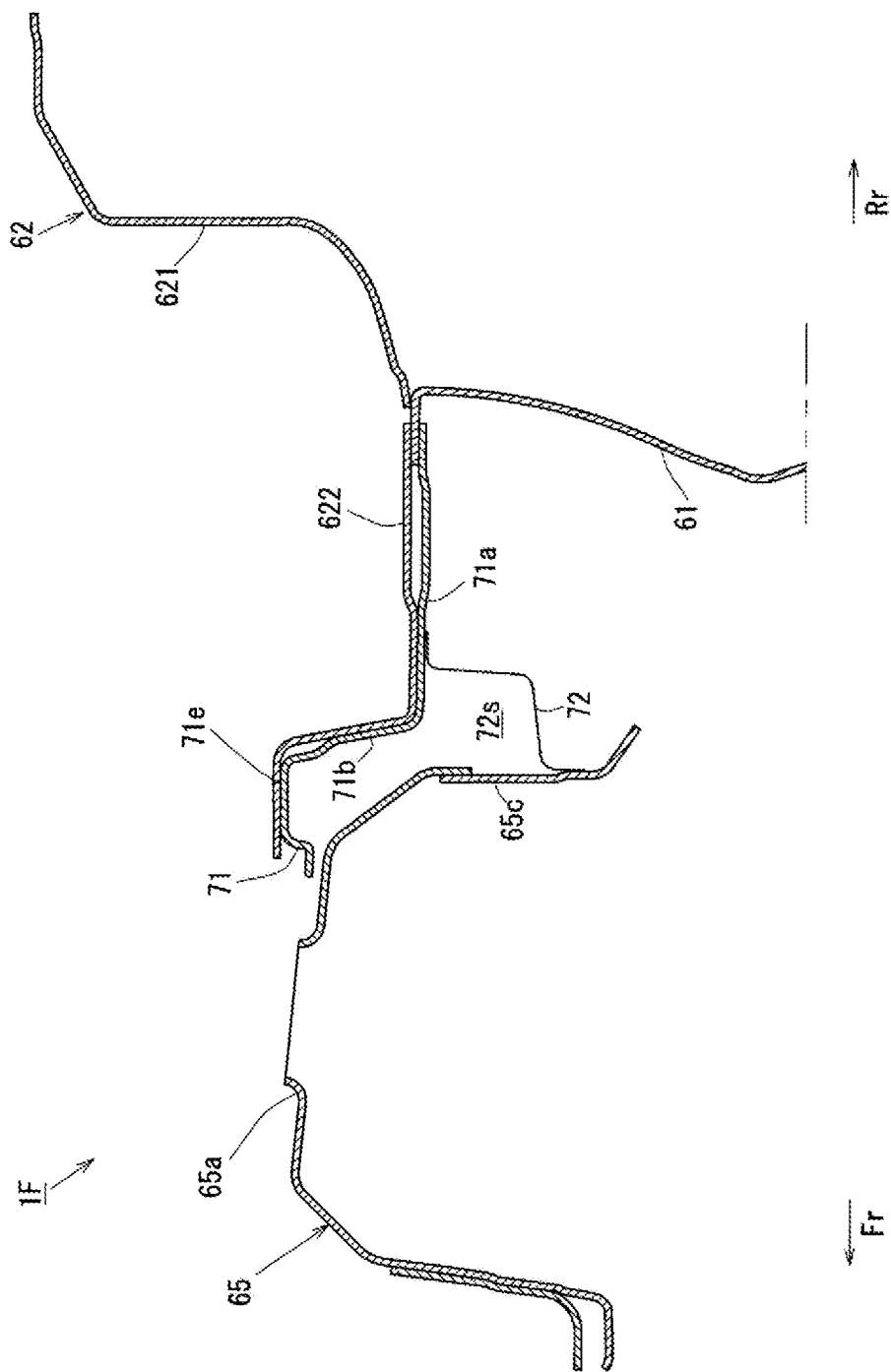
FIG. 9 A side view taken along an A-A cross section in FIG. 2.

More specifically, as illustrated in FIGS. 1 and 8, in the vehicle body rear portion 1R of this embodiment, a floor panel 21 is disposed on the floor of the cabin 2. A laterally center portion of the floor panel 21 projects inward in the cabin 2 to integrally form a tunnel portion 22 (floor tunnel) extending in the vehicle longitudinal direction.

The rear end of the floor panel 21 is coupled to a trunk floor portion 31 extending rearward substantially horizontally and in the vehicle lateral direction, through a floor rear cross-member 23 (see FIG. 3) extending as a vertical wall.

Accordingly, in the cabin 2, as illustrated in FIG. 8, a passenger space where the floor panel 21 is provided with an unillustrated seat (a seat cushion and a seat back) communicates, in the vehicle longitudinal direction, with a space in the trunk 3 located behind the passenger space and having a trunk floor portion 31 at a higher level than the floor panel 21 at the bottom.

As illustrated in FIGS. 1 and 8, the floor rear cross-member 23 rises to a level higher than the level of the upper surface of the tunnel portion 22, and a laterally intermediate portion of the floor rear cross-member 23 is joined to the tunnel portion 22. The floor rear cross-member 23 bridges rear ends of left and right side sills 46 described later.

The side sills 46 are joined and fixed to the outer lateral ends of the floor panel 21. As illustrated in FIG. 13(b), each of the side sills 46 is a vehicle body rigid member that has a closed cross-section space 46s extending in the vehicle longitudinal direction and formed by joining and fixing an inner panel 46a and an outer panel 46b each having a hat shape in cross section.

As illustrated in FIG. 1, a roof portion 9 of the vehicle is constituted by a pair of left and right roof side rails 91 extending in the vehicle longitudinal direction at the left and right sides of the vehicle body, a rear header 92 extending in the vehicle lateral direction at rear sides of the roof side rails 91, a roof cross-member 93 extending in the vehicle lateral direction in a longitudinally intermediate portion of the roof portion 9, a front header 94 extending in the vehicle lateral direction at front sides of the roof side rails 91, and a roof panel 95 covering a ceiling portion of the cabin 2.

As illustrated in FIG. 13(a), each of the roof side rails 91 is a vehicle body rigid member that has a closed cross-section space 91s extending in the vehicle longitudinal direction and formed by welding and fixing a roof side rail outer panel 91a, a roof reinforcement 91b, and a roof side rail inner panel 91c.

As described above, the roof panel 95 is disposed over a region surrounded by the pair of left and right roof side rails 91 extending in the vehicle longitudinal direction, the front header 94, and the rear header 92, and extends in the vehicle longitudinal direction and the vehicle lateral direction in a vehicle upper portion. The roof panel 95 is a panel member made of a steel sheet. Each of the front header 94 and the rear header 92 constitutes a substantially closed cross-section space structure together with the roof panel 95 disposed above the front header 94 and the rear header 92. The front header 94 and the rear header 92 constitute vehicle body rigid members extending in the vehicle lateral direction in a front portion and a rear portion, respectively, of the roof panel 95.

As illustrated in FIG. 8, the rear header 92 disposed at the rear of the roof panel 95 is integrated with a gutter portion 96 so that the rear header 92 and the gutter portion 96 form a closed cross-section space 92s extending in the vehicle lateral direction.

As illustrated in FIGS. 1 and 8, the rear opening Er is formed behind the rear header 92. Opening edges at the left and right sides of the rear opening Er are provided with a pair of left and right rear pillars 41 extending rearward and downward from the rear ends of the roof side rails 91 (i.e., portions corresponding to portions coupled to lateral ends of the rear header 92).

Although not shown, each of the rear pillars 41 is a vehicle body rigid member having a rear pillar closed cross-section space formed by joining and fixing a rear pillar outer and a rear pillar inner.

Next, the vehicle body rear portion 1R will be described.

As illustrated in FIG. 8, the opening edge of the rear opening Er formed behind the rear header 92 is provided with a rear end cross 71 that extends in the vehicle lateral direction and couples lower ends of the pair of left and right rear pillars 41 extending rearward and downward from the rear ends of the roof side rails 91.

Specifically, at the rear of the trunk 3, the rear end cross 71 constitutes a rear end 7 extending upward from the rear end of the trunk floor portion 31, together with a rear end panel 72.

Side pillars 42 extending downward and forward from the rear ends of the roof side rails 91 are disposed in both side portions of the vehicle body rear portion 1R between the rear ends of the side sills 46 and the rear ends of the roof side rails 91 (i.e., portions corresponding to portions joined to both lateral ends of the rear header 92). The side pillars 42 couple the rear ends of the side sills 46 to the rear ends of the roof side rails 91. The distance of the thus-configured side pillars 42 from damper support portions 54 described later increases toward the bottom.

In side portions of the vehicle body rear portion 1R, the center pillars 43 extending in the vehicle top-bottom direction (vertical direction) are disposed between longitudinally intermediate portions of the side sills 46 (i.e., portions of the side sills 46 ahead of a floor cross-member 24) and longitudinally intermediate portions of the roof side rails 91 (i.e., portions of the roof side rails 91 corresponding to the roof cross-member 93 in the longitudinal direction). The center pillars 43 couple the intermediate portions of the side sills 46 to the intermediate portions of the roof side rails 91 in the vehicle vertical direction.

Although not shown, each of the center pillars 43 is a vehicle body rigid member having a closed cross-section space formed by joining and fixing a center pillar inner and a center pillar outer substantially entirely in the vehicle vertical direction. The center pillars 43 and 43 in the vehicle body side portions are respectively coupled to the left and right outer ends of the front cross-member 24 described later in the vehicle lateral direction.

Specifically, as illustrated in FIGS. 1 and 8, in the vehicle body front portion 1F of this embodiment, the front pillars 44 extending from front lower portions to rear upper portions are disposed at the lateral sides. The front lower ends of the front pillars 44 are coupled to the hinge pillars 45 extending in the vertical direction.

Figure 10:
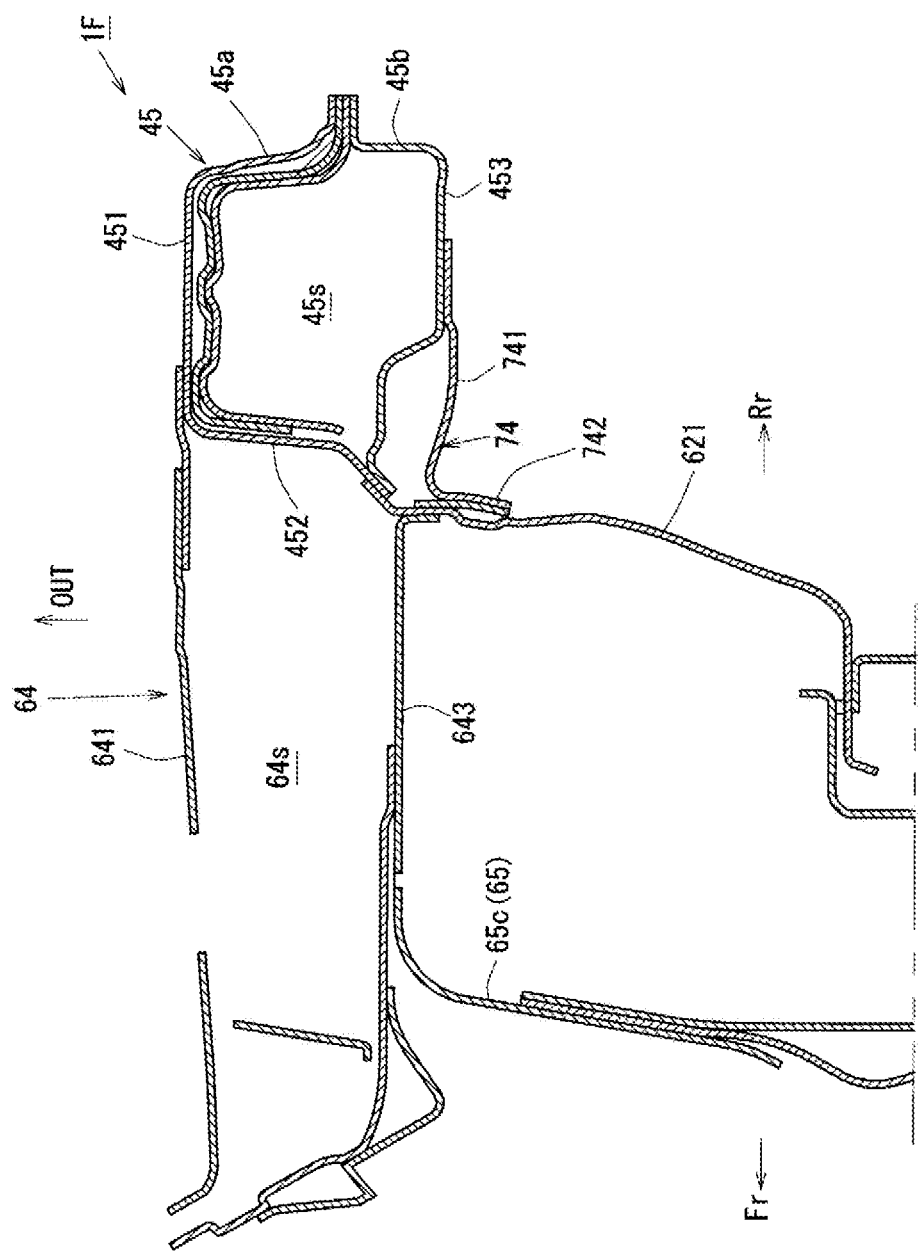
FIG. 10 A plan view taken along a B-B cross section in FIG. 2.

The front pillars 44 are constituted by joining the front pillar inners and the front pillar outers together. As illustrated in FIG. 10, each of the hinge pillars 45 is a vehicle body rigid member having a closed cross-section space 45s extending in the vehicle vertical direction by joining and fixing, in the vehicle lateral direction, a hat-shaped outer panel 45a projecting outward in the vehicle lateral direction, a hat-shaped inner panel 45b projecting inward in the vehicle lateral direction, and a hinge pillar reinforcement 45c extending along the inner surface of the outer panel 45a.

As described above, the pair of left and right roof side rails 91 extending in the vehicle longitudinal direction are formed to be continuous to the rear ends of the left and right front pillars 44. The front header 94 extending in the vehicle lateral direction (see FIG. 1) is bridged between the upper ends of the left and right front pillars 44 as described above. The rear header 92 extending in the vehicle lateral direction is bridged between the rear ends of the left and right roof side rails 91.

In the vehicle body rear portion 1R, as illustrated in FIG. 8, the side panels 51 are disposed between the side pillars 42 and the rear pillars 41, that is, at the laterally outer sides of the trunk 3, and below the side panels 51, rear wheelhouses 52 are disposed at lateral sides of the trunk floor portion 31, and wheelhouse reinforcements 53 extending in the vertical direction are disposed ahead of the rear wheelhouses 52. In upper portions of the rear wheelhouses 52, the damper support portions 54 supporting upper portions of suspension dampers (not shown) are disposed.

Each of the side panels 51 is constituted by a side panel outer at a vehicle outer side and a side panel inner 51a toward the trunk 3. In a closed cross-section space formed between the side panel outer and the side panel inner 51a in each of the side pillars 42, a side pillar reinforcement 42a having a substantially hat cross section in plan view is attached to the inner surface of the side panel inner 51a toward the closed cross-section space so that the side panel inner 51a and the side pillar reinforcement 42a constitute the side pillar 42 as a vehicle body rigid member having a closed cross-section space extending in the vehicle vertical direction.

Each of the rear wheelhouses 52 is constituted by a rear wheelhouse outer panel and a rear wheelhouse inner panel 52a, and a rear wheelhouse space where an unillustrated wheel is disposed is formed at an outer side of the vehicle.

The rear wheelhouse inner panels 52a expand from the lower ends of the side panel inners 51a inward in the vehicle lateral direction, that is, expand toward the trunk 3, and are coupled to the laterally outer sides of the trunk floor portion 31 at the innermost bottom thereof. Accordingly, each of the rear wheelhouse inner panels 52a has a substantially semi-circular dome shape projecting from the side panel inner 51a toward the trunk 3.

Upper portions of the thus-configured rear wheelhouse inner panels 52a, that is, the damper support portions 54 are thicker (hereinafter referred to as upper thick portions 56) than the other portion as illustrated in FIG. 8, and constitute mechanical structural members.

As described above, the upper thick portions 56 thicker than the other portion are provided with the damper support portions 54 that fix and support the upper ends of the suspension dampers (not shown) disposed in the rear wheelhouse spaces H at the outer sides of the vehicle.

As illustrated in FIG. 8, ahead of the longitudinal center of the rear wheelhouse inner panel 52a, the wheelhouse reinforcements 53 are disposed along the surfaces of the rear wheelhouse inner panels 52a toward the trunk 3 while tilting forward from upper portions of the rear wheelhouse inner panels 52a toward lower portions of the rear wheelhouse inner panels 52a.

The wheelhouse reinforcements 53 have substantially hat-shaped cross sections in plan view. The wheelhouse reinforcements 53 are attached to the inner surfaces of the rear wheelhouse inner panels 52a toward the trunk 3 so that the rear wheelhouse inner panels 52a and the wheelhouse reinforcements 53 constitute the vehicle body rigid members including closed cross-section spaces extending in the vehicle vertical direction.

Upper portions of the thus-configured wheelhouse reinforcements 53 are fixed to the upper thick portions 56 in the rear wheelhouse inner panels 52a. Front portions of the upper ends of the wheelhouse reinforcements 53 are coupled to the rear ends of the side pillars 42, and as illustrated in FIG. 8, the lower ends of the wheelhouse reinforcements 53 are coupled to the laterally outer sides of the floor rear cross-members 23.

Coupling members 33 coupling the front ends of upper portions of the side pillars 42 to front parts of the damper support portions 54 near the upper ends of the wheelhouse reinforcements 53 are disposed in a substantially oblique direction toward the front and upward in the vehicle.

Each of the coupling members 33 is a striker attachment bracket to which a striker 33a is attached. The striker 33a is configured to be engaged with a latch of a seat back constituting an unillustrated rear seat disposed on the floor panel 21 in a passenger space of the cabin 2.

The rear end of each of the coupling members 33 is wide so as to be coupled to the projection of the wheelhouse reinforcement 53 having a hat shape in cross section. The width of the coupling member 33 gradually decreases toward the front end of the coupling member 33 coupled to the front end of the upper portion of the side pillar 42. The coupling between the front end of the coupling member 33 to the upper end of the upper portion of the side pillar 42 and the coupling of the rear end of the coupling member 33 to the upper thick portion 56 as the front part of the damper support portion 54 near the upper end of the wheelhouse reinforcement 53 are made with unillustrated fastening bolts.

The coupling of the front end of the coupling member 33 to the front end of the upper portion of the side pillar 42 is made by coupling the front end of the coupling member 33 to the front end of an upper portion of the side pillar reinforcement 42a through the side panel inner 51a. A portion of the coupling member 33 toward the wheelhouse reinforcement is coupled to a front part of the damper support portion.

Next, the vehicle body front portion 1F will be described.

Figure 5:
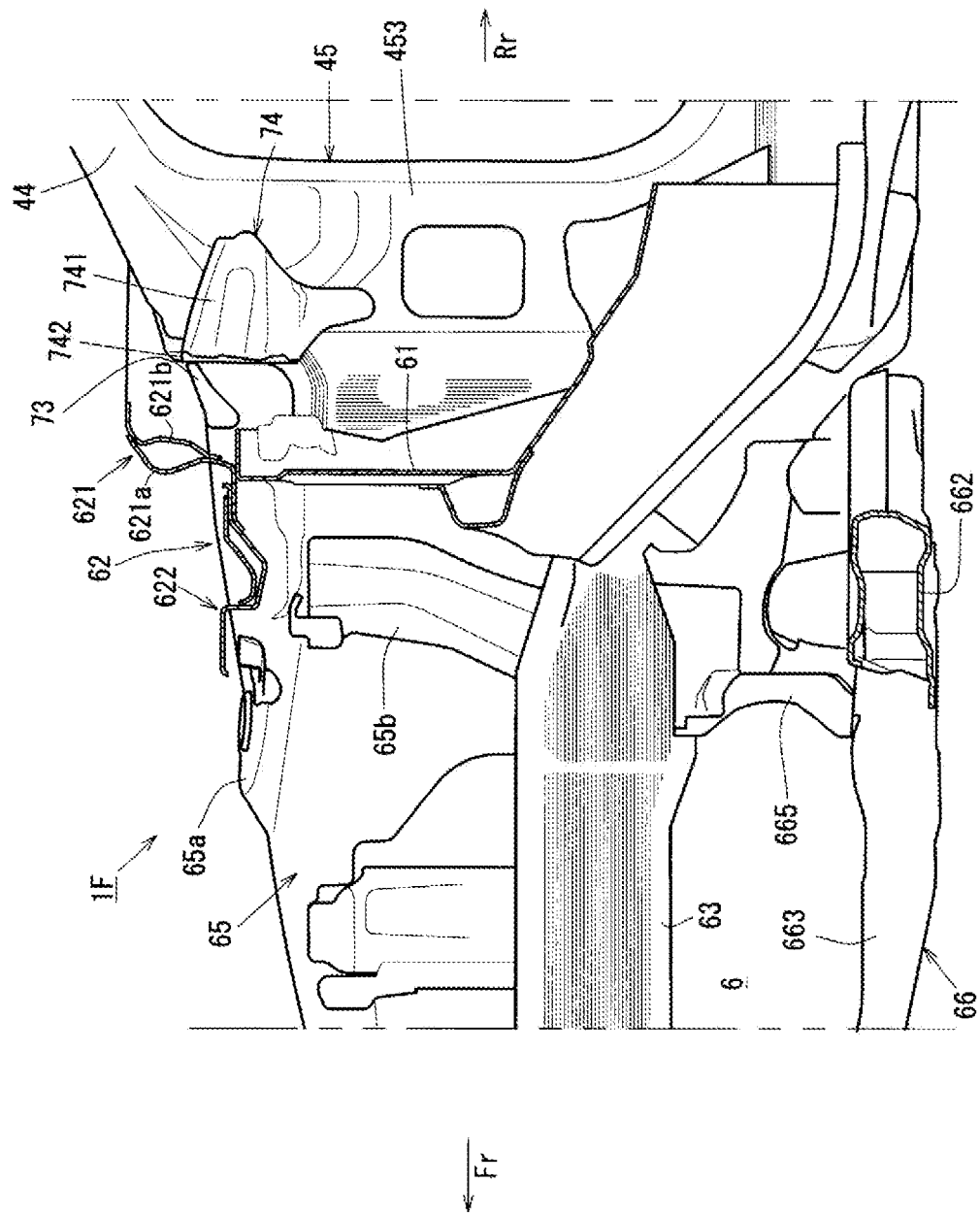
FIG. 5 A cross-sectional side view illustrating the main portion of the vehicle body structure in the vehicle front portion of the embodiment when seen from the inside.

As illustrated in FIGS. 1, 2, and 5, the vehicle body front portion 1F of the vehicle body 1 also includes a dash panel 61 rising from the front end of the floor panel 21, extending substantially across the entire width in the vehicle lateral direction, and separating an engine room 6 and the cabin 2 from each other. Above the dash panel 61, a cowl panel 621 extending in the vehicle lateral direction is disposed and supports the lower end of the front window across the substantially entire width thereof.

Figure 12:
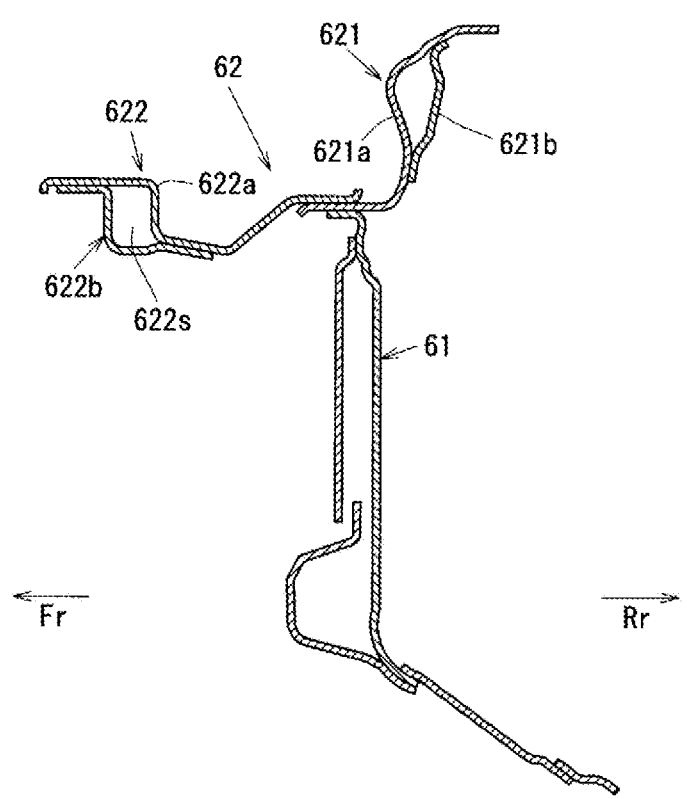
FIG. 12 A side view taken along a D-D cross section in FIG. 1.

As illustrated in FIG. 12, the cowl panel 621 constitutes a cowl box 62, together with a cowl cross member 622 extending in the vehicle lateral direction. Specifically, the cowl panel 621 is constituted by a front-side panel 621a having a substantially S shape in a side view and a cabin-side panel 621b. As illustrated in FIG. 12, the lower surface of the front-side panel 621a is joined to the upper end of the dash panel 61.

The cowl cross member 622 is a vehicle body rigid member having a closed cross-section space 622s extending in the vehicle lateral direction and formed by joining and fixing an upper member 622a having an inverted hat shape in side view and a rear end covering the front end of the front-side panel 621a and a lower member 622b having a substantially L shape in side view and extending along the lower surface of the upper member 622a to each other.

At the sides of the engine room 6 at the front of the dash panel 61, a pair of left and right front side frames 63 extends in the vehicle longitudinal direction, and below the pair of left and right front side frames 63, front subframes 66 extend in the lateral direction ahead of the dash panel 61.

As illustrated in FIGS. 1, 2, 5, and 7, the front subframes 66 are formed to have a substantially well-curb shape in plan view by a pair of left and right rear members 661 extending forward from the rear ends of the front subframes 66, a rear cross-member 662 coupling the front ends of the rear members 661 in the vehicle lateral direction, a pair of left and right front members 663 extending forward from the rear cross-member 662, and a front cross-member 664 coupling the front ends of the front members 663 in the vehicle lateral direction.

Suspension cross support portions 665 extending upward and laterally outward are disposed between the rear cross-member 662 and the front members 663, and suspension cross support portions 666 extending upward are disposed at the front ends of the front members 663.

In the thus-configured front subframes 66, the rear members 661 are coupled to the lower rear ends of the front side frames 63, the suspension cross support portions 665 are coupled to the rear lower surfaces of the front side frames 63, and the suspension cross support portions 666 are coupled to the front lower surfaces of the front ends of the front side frames 63 so that the front subframes 66 are supported by the front side frames 63 at six points.

Crash cans 67 extend forward from the front ends of the pair of left and right front members 663 in the front subframes 66, and a lower bumper beam 68 extends in the vehicle lateral direction across the front ends of the crash cans 67. Although not shown in FIGS. 1 and 2, crash cans extends forward from the front ends of the pair of left and right front side frames 63, and an upper bumper beam extends in the vehicle lateral direction across the front ends of the crash cans.

In addition, lower arms 69 that curve laterally outward from the rear to the front are disposed at the laterally outer left and right sides of the rear members 661 and the rear cross-member 662. The front outer ends of the lower arms 69 are coupled to the lower ends of front suspension dampers (not shown) whose upper ends are supported by the front damper support portions 65a.

As illustrated in FIGS. 1 through 6, a pair of left and right cowl side frames 64 extends forward from the upper ends of the hinge pillars 45 at locations separated upward and laterally outward from the front side frames 63.

At the lateral sides of the engine room 6, suspension towers 65 including the front damper support portions 65a are disposed and project laterally inward from cowl side inner surfaces 643 on rear portions positions of the cowl side frames 64 toward the longitudinal centers of the cowl side frames 64.

As illustrated in FIGS. 1 through 3, 5 through 7, and 9, the suspension towers 65 have substantially cylindrical shapes projecting laterally inward from the cowl side inner surfaces 643 as described above. The front damper support portions 65a (suspension tower upper surfaces) supporting upper portions of unillustrated front suspension dampers are disposed on the upper ends of the suspension towers 65. Suspension tower reinforcing members 65b constituted by closed cross sections extending in the vehicle vertical direction are disposed at the laterally inner side surfaces of the suspension towers 65.

The front damper support portions 65a constituting suspension tops in the cowl side frames 64 project upward from the cowl side upper surfaces 644 of the cowl side frames 64 to form substantially dome shapes. The wall surfaces of the suspension towers 65 toward the vehicle rear are front suspension tower rear walls 65c.

Figure 11:
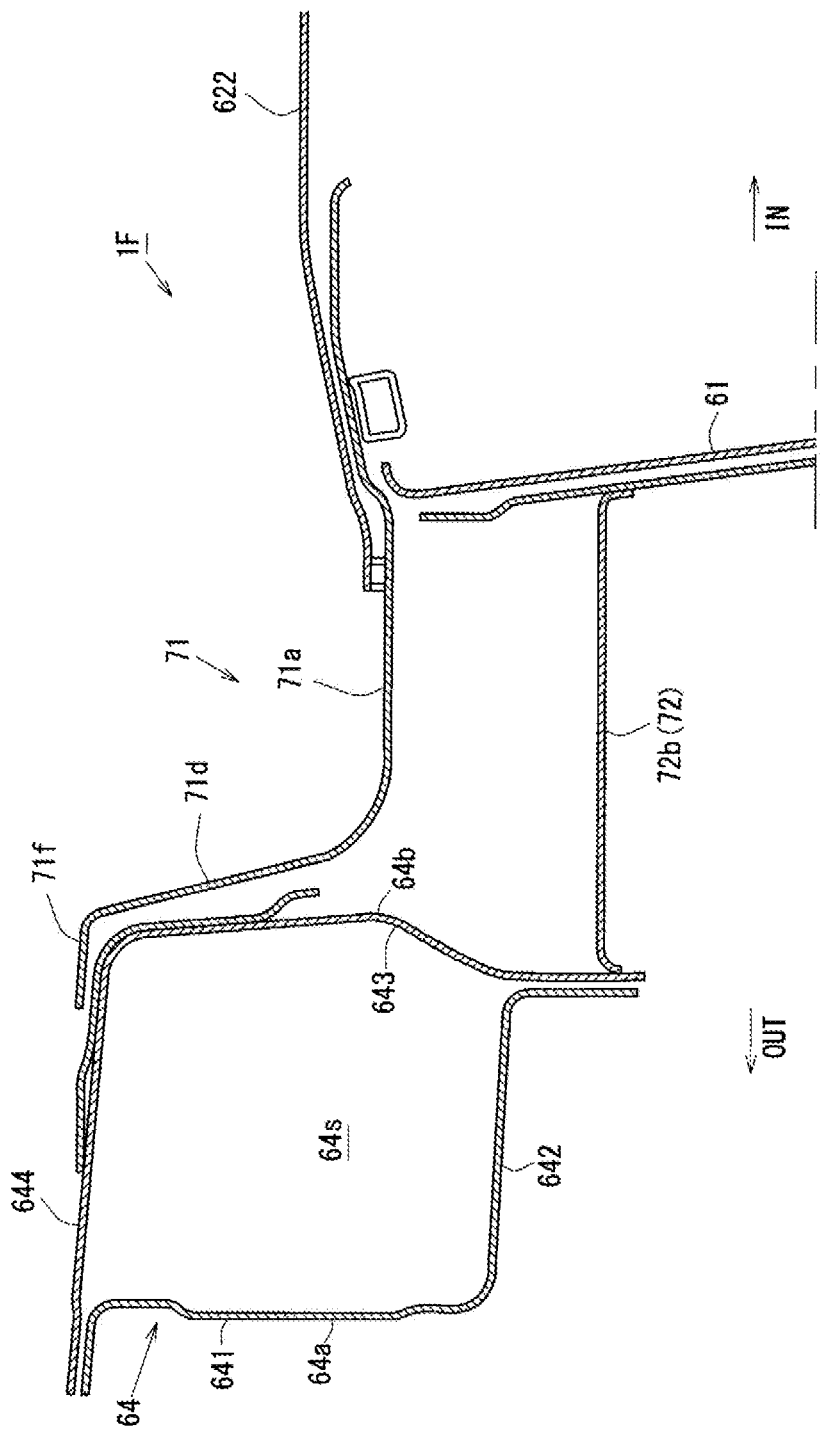
FIG. 11 A front view taken along a C-C cross section in FIG. 3.

The thus-configured cowl side frames 64 couple the upper ends of the hinge pillars 45 to the laterally outer sides of the suspension towers 65 in the vehicle longitudinal direction. As illustrated in FIGS. 4 and 11, the cowl side frames 64 are vehicle body rigid members having closed cross-section spaces 64s extending in the vehicle longitudinal direction by joining and fixing outer panels 64a having substantially L cross sections and constituting cowl side lower surfaces 642 together with cowl side outer surfaces 641 of the cowl side frames 64, to inner panels 64b having inverted L cross sections and constituting the cowl side upper surfaces 644 together with the cowl side inner surfaces 643 of the cowl side frames 64.

Figure 6:
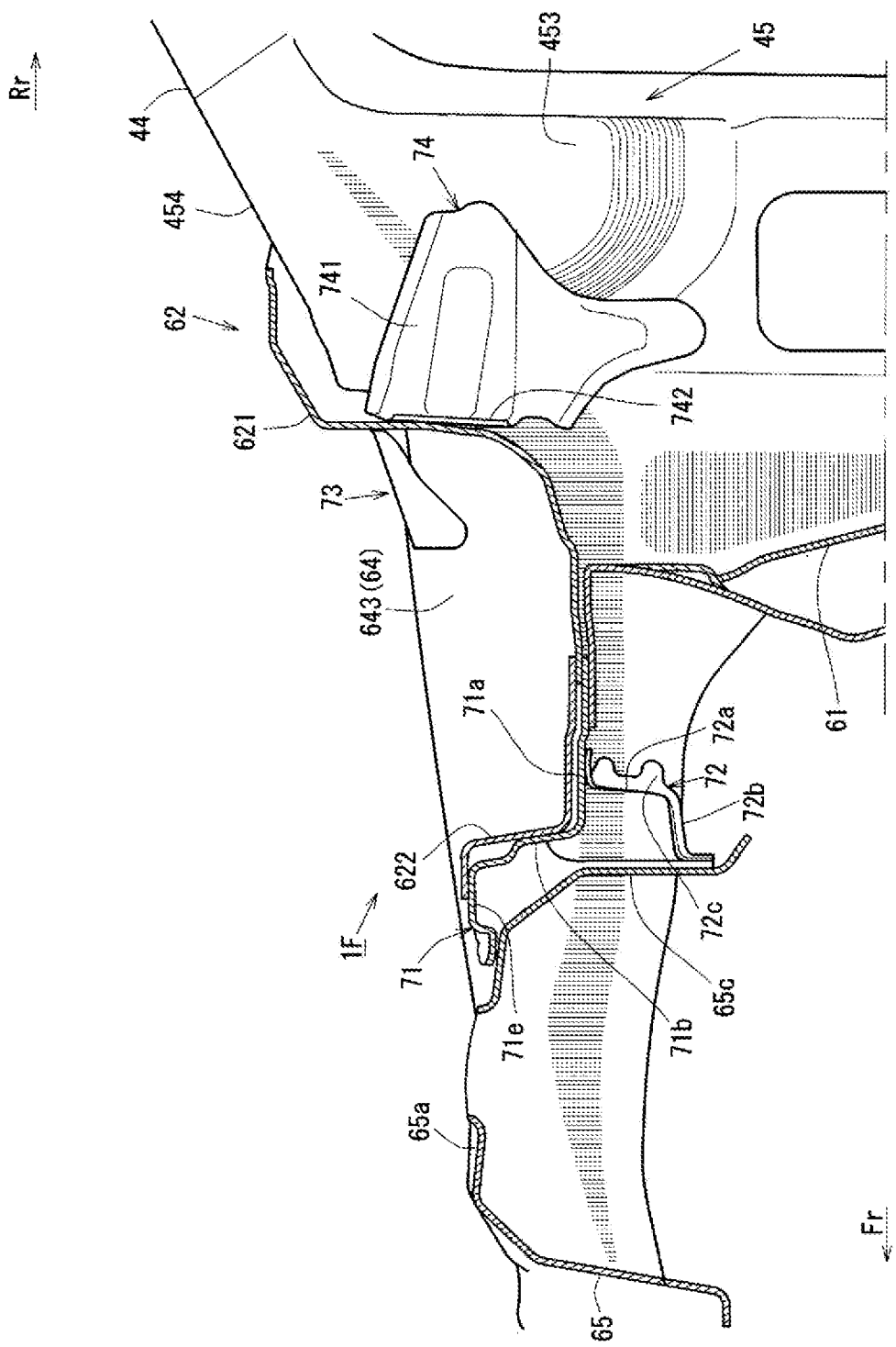
FIG. 6 A cross-sectional side view illustrating the main portion of the vehicle body structure in the vehicle front portion of the embodiment when seen from the inside.
Figure 7:
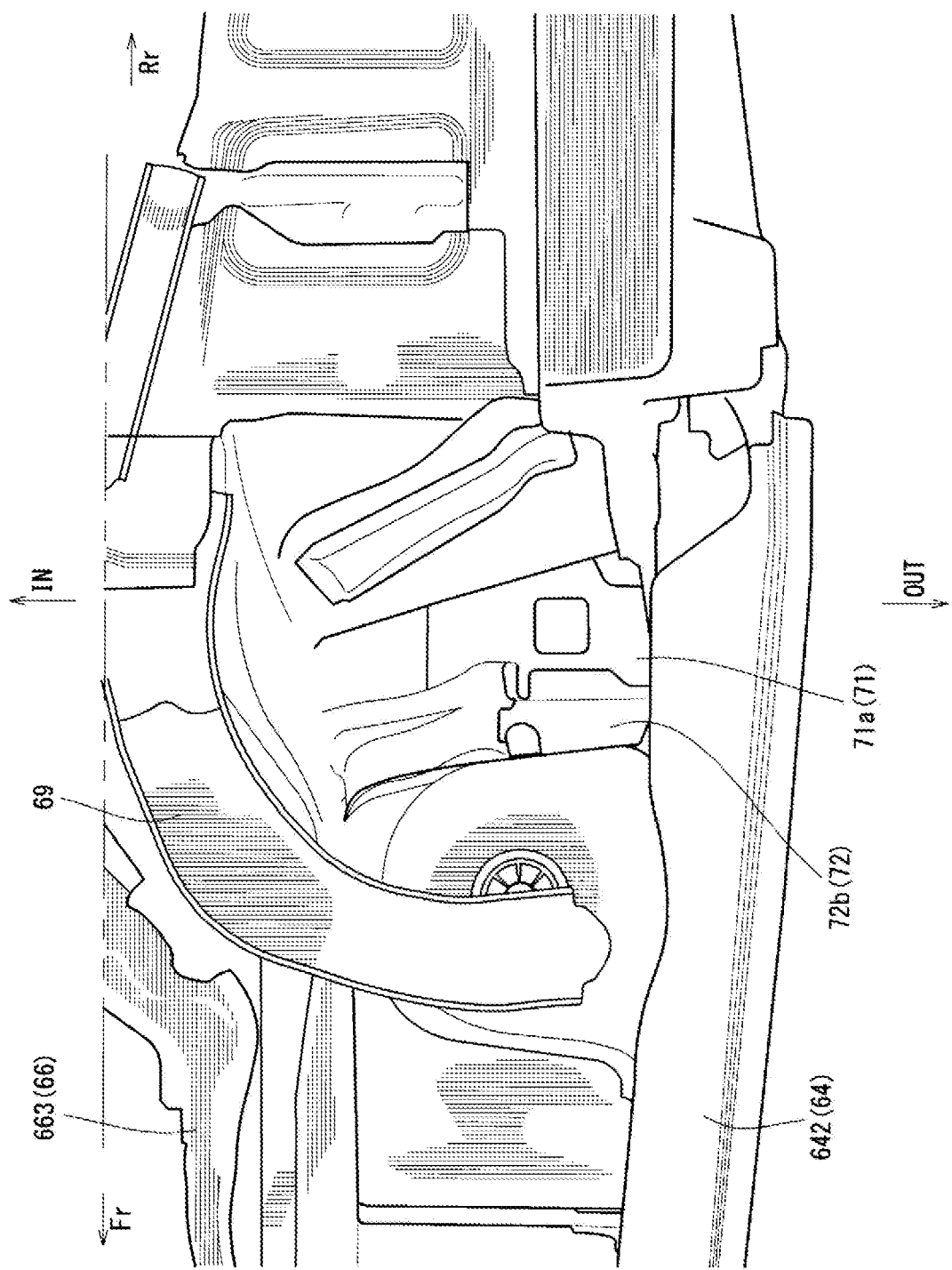
FIG. 7 A bottom view illustrating the main portion of the vehicle body structure in the vehicle front portion of the embodiment.

As illustrated in FIGS. 3, 4, and 6, the rear ends of the thus-configured cowl side frames 64 include cowl side reinforcements 73 that are coupled to the upper ends of the hinge pillars 45 and reinforce the coupling of the rear ends of the cowl side frames 64 to the upper ends of the hinge pillars 45.

As described above, the hinge pillars 45 to which the rear ends of the cowl side frames 64 are coupled are vehicle body rigid members each having the closed cross-section space 45s by joining the outer panel 5a, the inner panel 45b, and the hinge pillar reinforcement 45c.

In the hinge pillars 45, laterally outer side surfaces are hinge pillar outer side surfaces 451, side surfaces toward the front of the vehicle body are hinge pillar front side surfaces 452, and laterally inner side surfaces are hinge pillar inner side surfaces 453. The upper ends of the hinge pillars 45 include sloped upper surfaces 454 continuous to the front surfaces of the lower ends of the front pillars 44 described later.

The rear ends of the cowl side frames 64 are coupled to the hinge pillars 45 such that the rear ends of the cowl side frames 64 are joined and fixed to upper portions of the hinge pillars 45 by joining the rear ends of the cowl side outer surfaces 641 to the hinge pillar outer side surfaces 451 in upper portions of the hinge pillars 45, joining the rear ends of the cowl side lower surfaces 642 to the hinge pillar front side surfaces 452, joining the rear ends of the cowl side inner surfaces 643 to the hinge pillar inner side surfaces 453, and joining the rear ends of the cowl side upper surfaces 644 to the sloped upper surfaces 454.

As illustrated in FIG. 4, the cowl side reinforcements 73 that reinforce coupling of the rear ends of the cowl side frames 64 to the upper ends of the hinge pillars 45 have substantially inverted L cross sections in front view having front end portions enabling attachment across the cowl side upper surfaces 644 of the cowl side frames 64 and the cowl side inner surfaces 643, and each have a shape in plan view that tilts upward and laterally inward toward the rear of the vehicle body and is slightly curved laterally inward. Front portions of the cowl side reinforcements 73 having such shapes are joined to the rear ends of the cowl side frames 64 across the cowl side upper surfaces 644 and the cowl side inner surfaces 643, and rear portions of the cowl side reinforcements 73 are coupled to the hinge pillar inner side surfaces 453 of upper portions of the hinge pillars 45 across the sloped upper surfaces 454.

As illustrated in FIGS. 2 through 4, 6, and 9, the lateral ends of the cowl box 62 are coupled to the upper surfaces of the cowl side frames 64 and the suspension towers 65 through the side part panels 71.

The side part panels 71 connected to end portions of the cowl cross members 622 constituting the cowl box 62 are constituted by plate members thicker than the cowl panel 621, and have shapes described later.

Each of the side part panels 71 includes a substantially trapezoidal lower surface 71a having slopes whose front ends that are located toward the front and have laterally outer arc-shaped sides in plan view are tilted laterally outward and rearward, a front wall surface 71b extending upward from the tilted slopes of the lower surface 71a, a side wall surface 71d continuous to the front wall surface 71b through an arc-shaped wall surface 71c corresponding to the arc shape and extending upward from a laterally outer side of the lower surface 71a, a substantially horizontal front upper surface 71e extending forward from the upper end of the front wall surface 71b, and a substantially horizontal side upper surface 71f extending laterally outward from the upper end of the side wall surface 71d and continuous to the front upper surface 71e.

In the thus-configured side part panel 71, the front wall surface 71b extends along the rear side surface of the suspension tower 65, and the front upper surface 71e extending forward from an upper portion of the front wall surface 71*b* extends along the front damper support portion 65*a* that is the upper surface of the suspension tower 65 so that the side part panel 71 is joined and fixed to the suspension tower 65.

In addition, the side wall surface 71*d* of the side part panel 71 extends along the cowl side inner surface 643 of the cowl side frame 64 and the side upper surface 71*f* extending laterally outward from an upper portion of the side wall surface 71*d* extends along the cowl side upper surface 644 of the cowl side frame 64 so that the side part panel 71 is joined and fixed to the cowl side frame 64.

In the manner described above, the side part panels 71 connected to the laterally outer sides of the cowl cross member 622 in the cowl box 62 can be coupled to the suspension towers 65 and the cowl side frames 64.

As illustrated in FIGS. 4, 6, 7, and 9, the lower surfaces of the side part panels 71 are provided with side part panel reinforcing members 72 whose laterally inner sides are joined to the side part panels 71 and laterally outer ends are joined to the cowl side frames 64.

In the side part panel reinforcing members 72, vertical walls 72*a* extending downward from the lower surfaces 71*a* of the side part panels 71 and lower surfaces 72*b* extending forward from the lower ends of the vertical walls 72*a* constitute L cross sections in side view, and the laterally outer sides of the vertical walls 72*a* are provided with fixing flanges 72*c* for fixing to the cowl side inner surfaces 643 of the cowl side frames 64.

The upper ends of the vertical walls 72 of the thus-configured side part panel reinforcing members 72 are joined to the lower surfaces 71*a* of the side part panels 71, and the front ends of the lower surfaces 72*b* are joined to the front suspension tower rear walls 65*c* of the suspension towers 65 so that closed cross-section spaces 72*s* surrounded by the side part panels 71, the side part panel reinforcing members 72, and the front suspension tower rear walls 65*c* are formed as illustrated in FIG. 6.

As illustrated in FIGS. 3 through 6, the lateral ends of the cowl panels 621 constituting the cowl box 62 together with the cowl cross member 622 coupled to the cowl side frames 64 by the side part panels 71 as described above are coupled to the hinge pillar inner side surfaces 453 of the hinge pillars 45 by gusset members 74.

As illustrated in FIG. 6, in the gusset members 74, substantially L shapes in plan view are formed by gusset side walls 741 extending rearward from the front ends along the hinge pillar inner side surfaces 453 in the upper portions of the hinge pillars 45 and gusset front walls 742 projecting laterally inward from the front ends of the gusset side walls 741 and extending along the rear surfaces of the vertical wall portions of the cowl panels 621.

As illustrated in FIG. 4, upper portions of the gusset front walls 742 of the gusset members 74 coupling the lateral ends of the cowl panels 621 to the hinge pillar inner side surfaces 453 of the hinge pillars 45, are coupled to laterally inner portions of the upper ends of the cowl side reinforcements 73.

In the thus-configured vehicle body front portion 1F in the vehicle body 1, a vehicle body framework (hereinafter referred to as a front lateral ring-shaped vehicle body framework FWC) having a substantially ring shape in the vehicle lateral direction (see FIG. 1) are formed near the front damper support portions 65*a* by the pair of left and right front subframes 66, the suspension cross support portions 665, the suspension tower reinforcing members 65*b*, and the cowl box 62 extending in the vehicle lateral direction.

In the vehicle body front portion 1F of the vehicle body 1 having side portions configured as described above, front side door openings Esf to which unillustrated front side doors are attached are formed by the center pillars 43, front half portions of the side sills 46, the hinge pillars 45, the front pillars 44, and front half portions of the roof side rails 91, whereas in the vehicle body rear portion 1R, rear side door openings Esr to which unillustrated rear side doors are attached are formed by the center pillars 43, rear half portions of the side sills 46, the side pillars 42, and rear half portions of the roof side rails 91.

That is, the front side door openings Esf are formed ahead of the center pillars 43, the rear side door openings Esr are formed behind the center pillars 43. The side pillars 42 are disposed along the rear ends of the rear side door openings Esr.

As also described above, the front side door openings Esf at the vehicle front of (ahead of) the center pillars 43 and the rear side door openings Esr at the vehicle rear of (behind) the center pillars 43 are formed, and in the vehicle body side portions, the side sills 46, the hinge pillars 45, the front pillars 44, the roof side rails 91, and the side pillars 42 constitute the side door openings Es, and the side pillars 42 are disposed along the rear ends of the side door openings Es. In this manner, in the vehicle body side portions, the side sills 46, the hinge pillars 45, the front pillars 44, the roof side rails 91, and the side pillars 42 forming the side door openings Es constitute substantially ring-shaped vehicle body frameworks extending in the vehicle longitudinal direction (hereinafter referred to as longitudinal ring-shaped vehicle body frameworks SLC) as a vehicle body structure at each of the left and right vehicle body side portions, as illustrated in FIG. 1.

In the manner described above, the lateral sides of the cowl box 62 constituting the front lateral ring-shaped vehicle body framework FWC are coupled to the hinge pillars 45 constituting the longitudinal ring-shaped vehicle body frameworks SLC along the side door openings Es through the cowl side reinforcements 73 and the gusset members 74. Thus, the front lateral ring-shaped vehicle body framework FWC is mechanically coupled to the longitudinal ring-shaped vehicle body frameworks SLC, that is, a force exerted on at least one of the longitudinal ring-shaped vehicle body frameworks SLC or the front lateral ring-shaped vehicle body framework FWC can be transferred to the other.

The thus-configured coupling members 33 and the reinforcing plates 34 are used to constitute a substantially ring-shaped vehicle body framework in the vehicle lateral direction (hereinafter referred to as a rear lateral ring-shaped vehicle body framework RWC) (see FIG. 1).

Specifically, the rear lateral ring-shaped vehicle body framework RWC in the vehicle lateral direction is constituted by the rear header 92 in the vehicle lateral direction, the side pillars 42 at the left and right of the vehicle body, the coupling members 33, the wheelhouse reinforcements 53, and the floor rear cross-member 23 in the vehicle lateral direction.

Since the thus-configured rear lateral ring-shaped vehicle body framework RWC uses the side pillars 42 constituting the longitudinal ring-shaped vehicle body frameworks SLC along the side door openings Es, the rear lateral ring-shaped vehicle body framework RWC and the longitudinal ring-shaped vehicle body frameworks SLC are coupled to each other mechanically, that is, a force exerted on at least one of the longitudinal ring-shaped vehicle body frameworks SLC or the rear lateral ring-shaped vehicle body framework RWC can be transferred to the other.

That is, as described above, the front lateral ring-shaped vehicle body framework FWC mechanically coupled to the longitudinal ring-shaped vehicle body frameworks SLC and the rear lateral ring-shaped vehicle body framework RWC mechanically coupled to the longitudinal ring-shaped vehicle body frameworks SLC are coupled to each other through the longitudinal ring-shaped vehicle body frameworks SLC, and a load can be transferred to one another among the frames in the entire vehicle body 1.

As described above, the front lateral ring-shaped vehicle body framework FWC disposed ahead of the side door openings Es of the vehicle and disposed near the pair of left and right suspension towers 65 including the front damper support portions 65a supporting the front suspension dampers is constituted by the front subframes 66 coupling lower portions of the left and right suspension towers 65 in the vehicle lateral direction, the suspension tower reinforcing members 65b extending in the vehicle vertical direction along the suspension towers 65, and the cowl box 62 as the closed cross-section space 622s formed by the cowl panel 621 and the cowl cross member 622 disposed in the vehicle lateral direction and located behind the left and right suspension towers 65. The longitudinal ring-shaped vehicle body frameworks SLC having substantially ring shapes in the vehicle longitudinal direction are constituted by the pair of left and right hinge pillars 45 disposed in the vehicle body front portion, the pair of left and right front pillars 44 extending rearward and upward from the upper ends of the hinge pillars 45, the pair of left and right roof side rails 91 extending in the vehicle longitudinal direction, the pair of left and right side pillars 42 disposed along the rear ends of the side door openings Es, and the pair of left and right side sills 46 coupling the lower ends of the side pillars 42 to the lower ends of the hinge pillars 45 in the vehicle longitudinal direction. The vehicle body structure also includes the cowl side frames 64 coupling, in the vehicle longitudinal direction, the upper ends of the hinge pillars 45 constituting the longitudinal ring-shaped vehicle body frameworks SLC to the laterally outer sides of the suspension towers 65, and the side part panels 71 connected to the lateral ends of the cowl box 62 and coupled to the suspension towers 65. The side part panels 71 are made of plate members thicker than the cowl panel 621, and are constituted by the front wall surfaces 71b extending in the vehicle vertical direction along the front suspension tower rear walls 65c serving as rear side surfaces of the suspension towers 65, the front upper surfaces 71e continuous to upper portions of the front wall surfaces 71b and extending in the vehicle longitudinal direction along the front damper support portions 65a serving as upper surfaces of the suspension towers 65, the side wall surfaces 71d continuous to the front wall surfaces 71b and extending in the vehicle vertical direction along the cowl side inner surfaces 643 serving as laterally inner side surfaces of the cowl side frames 64, and the side upper surfaces 71f continuous to upper portions of the side wall surfaces 71d and the front upper surfaces 71e and extending in the vehicle lateral direction along the cowl side upper surfaces 644 serving as upper surfaces of the cowl side frames 64. Accordingly, support stiffness of the suspensions can be enhanced in the entire vehicle body in the vehicle body structure.

Specifically, the front lateral ring-shaped vehicle body framework FWC having the substantially ring shape in the vehicle lateral direction is disposed near the suspension towers 65 and is constituted by the front subframes 66 coupling the lower portions of the left and right suspension towers 65 in the vehicle lateral direction, the suspension tower reinforcing members 65b extending in the vehicle vertical direction along the suspension towers 65, and the cowl box 62 as the closed cross-section space 622s formed by the cowl panel 621 and the cowl cross member 622 disposed in the vehicle lateral direction and located behind the left and right suspension towers 65.

The longitudinal ring-shaped vehicle body frameworks SLC each having the substantially ring shape in the vehicle longitudinal direction are constituted by the pair of left and right hinge pillars 45 disposed in the vehicle body front portion, the pair of left and right front pillars 44 extending rearward and upward from the upper ends of the hinge pillars 45, the pair of left and right roof side rails 91 extending in the vehicle longitudinal direction, the pair of left and right side pillars 42 extending along the rear ends of the side door openings Es, and the pair of left and right side sills 46 coupling the lower ends of the side pillars 42 to the lower ends of the hinge pillars 45 in the vehicle longitudinal direction.

In addition, the longitudinal ring-shaped vehicle body frameworks SLC and the front lateral ring-shaped vehicle body framework FWC are coupled to each other in the vehicle longitudinal direction by the cowl side frames 64 coupling the upper ends of the hinge pillars 45 constituting the longitudinal ring-shaped vehicle body frameworks SLC to the laterally outer sides of the suspension towers 65 constituting the front lateral ring-shaped vehicle body framework FWC.

Moreover, the side part panels 71 coupled to the cowl box 62 and the suspension towers 65 constituting the front lateral ring-shaped vehicle body framework FWC are made of the plate materials thicker than the cowl panel 621, and are constituted by the front wall surfaces 71b extending in the vehicle vertical direction along the front suspension tower rear walls 65c serving as rear side surfaces of the suspension towers 65, the front upper surfaces 71e continuous to upper portions of the front wall surfaces 71b and extending in the vehicle longitudinal direction along the front damper support portions 65a serving as upper surfaces of the suspension towers 65, the side wall surfaces 71d continuous to the front wall surfaces 71b and extending in the vehicle vertical direction along the cowl side inner surfaces 643 serving as laterally inner side surfaces of the cowl side frames 64, and the side upper surfaces 71f continuous to upper portions of the side wall surfaces 71d and the front upper surfaces 71e and extending in the vehicle lateral direction along the cowl side upper surfaces 644 serving as upper surfaces of the cowl side frames 64. Accordingly, support stiffness of the suspensions can be enhanced in the entire vehicle body in the vehicle body structure.

In the side part panels 71, the front wall surfaces 71b and the side wall surfaces 71d form bent shapes such as substantially L shapes in plan view, and the front upper surfaces 71e continuous to the upper portions of the front wall surfaces 71b are continuous to the side upper surfaces 71f continuous to the upper portions of the side wall surface 71d. Thus, bent shapes such as substantially L shapes in plan view are also formed in cross sections in the vehicle longitudinal direction and the vehicle lateral direction along the vehicle vertical direction. In addition, since the side part panels 71 are made of plate materials thicker than the cowl panel 621, members having high stiffness with respect to any direction in three dimensions can be obtained.

In addition, the front wall surfaces 71b of the side part panels 71 constituting members having high stiffness with respect to any direction in three dimensions with the configuration described above extend along the front suspension tower rear walls 65c, the front upper surfaces 71e continuous to the upper portions of the front wall surfaces 71b extend along the front damper support portions 65a, the side wall surfaces 71d continuous to the front wall surfaces 71b extend along the cowl side inner surfaces 643, and the side upper surfaces 71f continuous to the upper portions of the side wall surfaces 71d and the front upper surfaces 71e extend along the cowl side upper surfaces 644. Thus, joint portions of the front suspension tower rear walls 65c can be reinforced, and as compared to the case of coupling with a merely plate-shaped coupling member, for example, stiffness in coupling to the front lateral ring-shaped vehicle body framework FWC in the cowl side frames 64 can be enhanced.

In the manner described above, since the side part panels 71 can enhance stiffness in coupling to the front lateral ring-shaped vehicle body framework FWC in the cowl side frames 64 coupling the longitudinal ring-shaped vehicle body frameworks SLC and the front lateral ring-shaped vehicle body framework FWC to each other. Accordingly, support stiffness of the suspensions can be enhanced in the entire vehicle. Thus, forces input by the front suspensions and the rear suspensions can be transferred without delay so that comfort of passengers can be enhanced.

Furthermore, even in a case where the suspension towers 65 are separated away from the cowl box 62, since the side part panels 71 made of plate members thicker than the cowl panel 621 couple the suspension towers 65 to the cowl box 62, the front lateral ring-shaped vehicle body framework FWC having high stiffness can be obtained.

Moreover, the side part panel reinforcing members 72 whose laterally inner sides are joined to the side part panels 71 and laterally outer ends are joined to the cowl side frames 64 are provided, and the closed cross sections extending in the vehicle lateral direction are formed by the side part panels 71, the side part panel reinforcing members 72, and the front suspension tower rear walls 65c. Thus, support stiffness of the suspensions can be further enhanced in the entire vehicle body in the vehicle body structure.

Specifically, stiffness in coupling to the front lateral ring-shaped vehicle body framework FWC in the cowl side frames 64 can be further enhanced by the side part panel 71 coupled to the cowl side frames 64 coupling the longitudinal ring-shaped vehicle body frameworks SLC to the front lateral ring-shaped vehicle body framework FWC to the cowl box 62 and by the side part panel reinforcing members 72 whose laterally inner sides are joined to the side part panels 71 and laterally outer ends are joined to the cowl side frames 64.

In addition, since the closed cross section extending in the vehicle lateral direction is formed by the side part panels 71, the side part panel reinforcing members 72, and the front suspension tower rear walls 65c, stiffness of the suspension towers 65, that is, support stiffness of the front dampers, can be enhanced. Thus, inward collapse of the suspension towers 65 can be reduced, forces input by the front suspensions and the rear suspensions can be transferred without delay, and comfort of passengers can be enhanced.

The cowl side frames 64 have the closed cross-section spaces 64s extending in the vehicle longitudinal direction and constituted by the cowl side outer surfaces 641 serving as laterally outer side surfaces, and the cowl side upper surfaces 644 and the cowl side lower surfaces 642 respectively coupling upper portions and lower portions of the cowl side outer surfaces 641 and the cowl side inner surfaces 643. The hinge pillars 45 extending in the vehicle vertical direction include the hinge pillar outer side surfaces 451 serving as laterally outer side surfaces, the hinge pillar inner side surfaces 453 serving as laterally inner side surfaces, and the hinge pillar front side surfaces 452 disposed at the front ends of the hinge pillar outer side surfaces 451 and serving as side surfaces toward the front in the vehicle longitudinal direction. The rear ends of the cowl side outer surfaces 641, the cowl side inner surfaces 643, and the cowl side lower surfaces 642 are coupled to the hinge pillar outer side surfaces 451, the hinge pillar inner side surfaces 453, and the hinge pillar front side surfaces 452, respectively. The rear ends of the cowl side upper surfaces 644 are joined to the sloped upper surfaces 454 above the hinge pillars 45. The cowl side reinforcements 73 whose front portions are joined to the rear ends of the cowl side upper surfaces 644 and rear portions are joined to the hinge pillar inner side surfaces 453 are provided. Accordingly, coupling between the cowl side frames 64 coupling the front lateral ring-shaped vehicle body framework FWC to the longitudinal ring-shaped vehicle body frameworks SLC and the hinge pillars 45 constituting the longitudinal ring-shaped vehicle body frameworks SLC can be reinforced through the cowl side reinforcements 73, and stiffness in coupling the front lateral ring-shaped vehicle body framework FWC to the longitudinal ring-shaped vehicle body frameworks SLC can be further enhanced.

In addition, the gusset members 74 coupling the lateral ends of the cowl panel 621 to the hinge pillar inner side surfaces 453 are provided, and the cowl side reinforcements 73 are coupled to the gusset members 74. Accordingly, coupling between the cowl side frames 64 coupling the front lateral ring-shaped vehicle body framework FWC to the longitudinal ring-shaped vehicle body frameworks SLC and the cowl panel 621 constituting the front lateral ring-shaped vehicle body framework FWC can be reinforced through the cowl side reinforcements 73 and the gusset members 74. Thus, stiffness in coupling the front lateral ring-shaped vehicle body framework FWC to the longitudinal ring-shaped vehicle body frameworks SLC can be further enhanced.

Since the rear lateral ring-shaped vehicle body framework RWC having the substantially ring shape in the vehicle lateral direction is disposed near the damper support portions 54 of the left and right rear suspensions and is constituted by the rear header 92, the side pillars 42 disposed the rear ends of the side door openings Es, the pair of left and right wheelhouse reinforcements 53 disposed along the rear wheelhouses 52, and the floor rear cross-member 23, the rear lateral ring-shaped vehicle body framework RWC having the substantially ring shape in the vehicle lateral direction and formed near the damper support portions 54 of the left and right rear suspensions can be coupled to the longitudinal ring-shaped vehicle body frameworks SLC by using the side pillars 42.

Thus, the front lateral ring-shaped vehicle body framework RWC is coupled to the rear lateral ring-shaped vehicle body framework RWC through the longitudinal ring-shaped vehicle body frameworks SLC so that support stiffness of the suspension can be enhanced in the entire vehicle body.

As correspondences between the configuration of the technique disclosed here and the embodiment described above, damper support portions correspond to the front damper support portions 65a, and similarly, front suspension towers correspond to the suspension towers 65, a vehicle body framework in a vehicle lateral direction corresponds to the front lateral ring-shaped vehicle body framework FWC, a closed cross section member corresponds to the closed cross-section space 622s, a cowl member corresponds to the cowl box 62, vehicle body frameworks in a longitudinal direction correspond to the longitudinal ring-shaped vehicle body frameworks SLC, front suspension tower upper surfaces correspond to the front damper support portions 65a, a closed cross section corresponds to the closed cross-section space 64s, a floor cross-member corresponds to the floor rear cross-member 23, and a vehicle body framework corresponds to the rear lateral ring-shaped vehicle body framework RWC. However, the technique disclosed here is not limited only to the configuration of the above embodiment, and is applicable to may embodiments.

For example, the foregoing description is directed to the vehicle body including the center pillars 43, but a two-door type vehicle body including no center pillars 43 may be used.

DESCRIPTION OF REFERENCE CHARACTERS 23 floor rear cross-member
42 side pillar
44 front pillar
45 hinge pillar
46 side sill
52 rear wheelhouse
53 wheelhouse reinforcement
54a damper support portion
62 cowl box
64 cowl side frame
64s closed cross-section space
65 suspension tower
65a front damper support portion
65b suspension tower reinforcing member
65c front suspension tower rear wall
66 front subframe
71 side part panel
71b front wall surface
71e front upper surface
71d side wall surface
71f side upper surface
72 side part panel reinforcing member
73 cowl side reinforcement
74 gusset member
91 roof side rail
92 rear header
451 hinge pillar outer side surface
452 hinge pillar front side surface
453 hinge pillar inner side surface
454 sloped upper surface
621 cowl panel
622 cowl cross member
622s closed cross-section space
641 cowl side outer surface
642 cowl side lower surface
643 cowl side inner surface
644 cowl side upper surface
Es side door opening
FWC front lateral ring-shaped vehicle body framework (first vehicle body framework)
SLC longitudinal ring-shaped vehicle body framework (second vehicle body framework)
RWC rear lateral ring-shaped vehicle body framework (third vehicle body framework)

The invention claimed is:

1. A vehicle body structure comprising:
a first vehicle body framework having a substantially ring shape in a vehicle lateral direction, and disposed at vehicle front of side door openings of the vehicle; and
second vehicle body frameworks each having a ring shape in a vehicle longitudinal direction at peripheries of the side door openings of the vehicle, wherein
the first vehicle body framework includes
a pair of left and right front suspension towers including damper support portions supporting front suspension dampers,
front subframes coupling lower portions of the pair of left and right front suspension towers in the vehicle lateral direction,
suspension tower reinforcing members extending in a vehicle vertical direction along the pair of left and right front suspension towers, and
a cowl member that is a closed cross section member formed by a cowl panel and a cowl cross member, the cowl panel and the cowl cross member being disposed in the vehicle lateral direction behind the pair of left and right front suspension towers,
the second vehicle body framework includes
a pair of left and right hinge pillars disposed in a vehicle body front portion,
a pair of left and right front pillars extending rearward and upward from upper ends of the pair of left and right hinge pillars,
a pair of left and right roof side rails extending in the vehicle longitudinal direction,
a pair of left and right side pillars disposed along rear ends of the side door openings, and
a pair of left and right side sills coupling lower ends of the pair of left and right side pillars to lower ends of the pair of left and right hinge pillars in the vehicle longitudinal direction,
the vehicle body structure further comprises
cowl side frames coupling, in the vehicle longitudinal direction, upper ends of the pair of left and right hinge pillars constituting the second vehicle body framework to outer sides of the pair of left and right front suspension towers in the vehicle lateral direction, and
side part panels connected to ends of the cowl member in the vehicle lateral direction, and coupled to the pair of left and right front suspension towers, and
the side part panels are made of plate members thicker than the cowl panel, and include
front wall surfaces extending in the vehicle vertical direction along front suspension tower rear walls serving as rear side surfaces of the pair of left and right front suspension towers,
front upper surfaces continuous to upper portions of the front wall surfaces and extending in the vehicle longitudinal direction along front suspension tower upper surfaces serving as upper surfaces of the pair of left and right front suspension towers,
side wall surfaces continuous to the front wall surfaces and extending in the vehicle vertical direction along cowl side inner surfaces serving as inner side surfaces of the cowl side frames in the vehicle lateral direction, and side upper surfaces continuous to upper portions of the side wall surfaces and the front upper surfaces, and extending in the vehicle lateral direction along cowl side upper surfaces serving as upper surfaces of the cowl side frames.

2. The vehicle body structure according to claim 1, further comprising side part panel reinforcing members whose inner sides in the vehicle lateral direction are joined to the side part panels and whose outer ends in the vehicle lateral direction are joined to the cowl side frames, wherein the side part panels, the side part panel reinforcing members, and the front suspension tower rear walls constitute a closed cross section extending in the vehicle lateral direction.

3. The vehicle body structure according to claim 1, wherein the cowl side frames have closed cross sections extending in the vehicle longitudinal direction and constituted by cowl side outer surfaces serving as outer side surfaces in the vehicle lateral direction, the cowl side upper surfaces coupling upper portions of the cowl side outer surfaces and the cowl side inner surfaces, and cowl side lower surfaces coupling lower portions of the cowl side outer surfaces and the cowl side inner surfaces, the pair of left and right hinge pillars extending in the vehicle vertical direction includes hinge pillar outer side surfaces serving as outer side surfaces in the vehicle lateral direction, hinge pillar inner side surfaces serving as inner side surfaces in the vehicle lateral direction, and hinge pillar front side surfaces disposed at front ends of the hinge pillar outer side surfaces and serving as front side surfaces in vehicle longitudinal direction, rear ends of the cowl side outer surfaces, the cowl side inner surfaces, and the cowl side lower surfaces are joined to the hinge pillar outer side surfaces, the hinge pillar inner side surfaces, and the hinge pillar front side surfaces, respectively, rear ends of the cowl side upper surfaces are joined to upward surfaces of the pair of left and right hinge pillars, and the vehicle body structure further comprises cowl side reinforcements whose front portions are joined to rear ends of the cowl side upper surfaces and whose rear portions are joined to the hinge pillar inner side surfaces.

4. The vehicle body structure according to claim 2, wherein the cowl side frames have closed cross sections extending in the vehicle longitudinal direction and constituted by cowl side outer surfaces serving as outer side surfaces in the vehicle lateral direction, the cowl side upper surfaces coupling upper portions of the cowl side outer surfaces and the cowl side inner surfaces, and cowl side lower surfaces coupling lower portions of the cowl side outer surfaces and the cowl side inner surfaces, the pair of left and right hinge pillars extending in the vehicle vertical direction includes hinge pillar outer side surfaces serving as outer side surfaces in the vehicle lateral direction, hinge pillar inner side surfaces serving as inner side surfaces in the vehicle lateral direction, and hinge pillar front side surfaces disposed at front ends of the hinge pillar outer side surfaces and serving as front side surfaces in vehicle longitudinal direction, rear ends of the cowl side outer surfaces, the cowl side inner surfaces, and the cowl side lower surfaces are joined to the hinge pillar outer side surfaces, the hinge pillar inner side surfaces, and the hinge pillar front side surfaces, respectively, rear ends of the cowl side upper surfaces are joined to upward surfaces of the pair of left and right hinge pillars, and the vehicle body structure further comprises cowl side reinforcements whose front portions are joined to rear ends of the cowl side upper surfaces and whose rear portions are joined to the hinge pillar inner side surfaces.

5. The vehicle body structure according to claim 3, further comprising gusset members coupling ends of the cowl panels in the vehicle lateral direction to the hinge pillar inner side surfaces, wherein the cowl side reinforcements are coupled to the gusset members.

6. The vehicle body structure according to claim 4, wherein gusset members coupling ends of the cowl panels in the vehicle lateral direction to the hinge pillar inner side surfaces, wherein the cowl side reinforcements are coupled to the gusset members.

7. The vehicle body structure according to claim 1, further comprising a third vehicle body framework having a substantially ring shape in the vehicle lateral direction and disposed near damper support portions of left and right rear suspensions, wherein third vehicle body framework includes a rear header, the pair of left and right side pillars, a pair of left and right wheelhouse reinforcements disposed along rear wheelhouses, and floor cross-members.

8. The vehicle body structure according to claim 2, further comprising a third vehicle body framework having a substantially ring shape in the vehicle lateral direction and disposed near damper support portions of left and right rear suspensions, wherein the third vehicle body framework includes a rear header, the pair of left and right side pillars, a pair of left and right wheelhouse reinforcements disposed along rear wheelhouses, and floor cross-members.

9. The vehicle body structure according to claim 3, further comprising a third vehicle body framework having a substantially ring shape in the vehicle lateral direction and disposed near damper support portions of left and right rear suspensions, wherein the third vehicle body framework includes a rear header, the pair of left and right side pillars, a pair of left and right wheelhouse reinforcements disposed along rear wheelhouses, and floor cross-members.

10. The vehicle body structure according to claim 4, further comprising
 a third vehicle body framework having a substantially ring shape in the vehicle lateral direction and disposed near damper support portions of left and right rear suspensions, wherein
 the third vehicle body framework includes
  a rear header,
  the pair of left and right side pillars,
  a pair of left and right wheelhouse reinforcements disposed along rear wheelhouses, and
  floor cross-members.

11. The vehicle body structure according to claim 5, further comprising
 a third vehicle body framework having a substantially ring shape in the vehicle lateral direction and disposed near damper support portions of left and right rear suspensions, wherein
 the third vehicle body framework includes
  a rear header,
  the pair of left and right side pillars,
  a pair of left and right wheelhouse reinforcements disposed along rear wheelhouses, and
  floor cross-members.

12. The vehicle body structure according to claim 6, further comprising
 a third vehicle body framework having a substantially ring shape in the vehicle lateral direction and disposed near damper support portions of left and right rear suspensions, wherein
 the third vehicle body framework includes
  a rear header,
  the pair of left and right side pillars,
  a pair of left and right wheelhouse reinforcements disposed along rear wheelhouses, and
  floor cross-members.

\* \* \* \* \*